United States Patent [19]
Yang

[11] Patent Number: 5,994,466
[45] Date of Patent: Nov. 30, 1999

[54] CASTABLE POLYURETHANE ELASTOMERS FOR INDUSTRIAL ROLLERS

[75] Inventor: Yan Yang, Manassas, Va.

[73] Assignee: Stowe Woodward Company, Middletown, Va.

[21] Appl. No.: 08/873,224

[22] Filed: Jun. 11, 1997

Related U.S. Application Data

[60] Provisional application No. 60/019,659, Jun. 12, 1996.

[51] Int. Cl.$^6$ .................................................. C08G 18/66
[52] U.S. Cl. .......................... 525/130; 525/131; 528/61; 528/63; 528/64; 528/75
[58] Field of Search ..................................... 525/130, 131; 528/61, 63, 75, 64

[56] References Cited

U.S. PATENT DOCUMENTS

| | | | |
|---|---|---|---|
| 4,053,446 | 10/1977 | Watabe | 528/75 |
| 4,343,339 | 8/1982 | Schwindt | 528/75 |

FOREIGN PATENT DOCUMENTS

| | | | |
|---|---|---|---|
| 0829497 | 3/1998 | European Pat. Off. | C08G 18/62 |
| WO91/09894 | 7/1991 | WIPO | C08G 18/36 |
| 9413722 | 6/1994 | WIPO . | |
| WO94/13722 | 6/1994 | WIPO | C08G 18/10 |
| WO96/11220 | 4/1996 | WIPO | C08G 18/67 |
| WO97/02305 | 1/1997 | WIPO | C08G 18/62 |
| WO97/00901 | 9/1997 | WIPO | C08G 18/62 |
| WO97/42246 | 11/1997 | WIPO | C08G 18/10 |

*Primary Examiner*—Patricia A. Short
*Attorney, Agent, or Firm*—Myers, Bigel, Sibley & Sajovec

[57] ABSTRACT

The present invention relates to polyurethane elastomer systems for industrial and paper mill rolls and more particularly to polyurethane covered rolls made from a new polyurethane composition of a polyurethane prepolymer cured with an aromatic diamine and a hydroxyl-terminated polybutadiene resin. Rolls made with this new polyurethane composition exhibit improved dynamics, hydrolytic stability, and reduced water vapor transmission over conventional polyurethane elastomer systems.

11 Claims, 25 Drawing Sheets

CASTABLE POLYURETHANE ELASTOMERS FOR INDUSTRIAL ROLLERS

RELATED APPLICATIONS

This application claims the benefit of U.S. Provisional Application Ser. No. 60/019,659 filed Jun. 12, 1996.

FIELD OF THE INVENTION

This invention relates generally to rollers for paper-making machines and more particularly to polyurethane compositions used to cover paper-making rollers that exhibit improved dynamics, hydrolytic stability and reduced water vapor transmission.

BACKGROUND OF THE INVENTION

Conventional castable polyurethane elastomers have been used in various industries for over fifty years. Polyurethane is generally the product of a reaction between a polyurethane prepolymer and a curing agent. The polyurethane prepolymer is typically made by combining a polyol with a diisocyanate, such as toluene diisocyanate (TPI). The curing agent is often either a diamine or a short chain dial. In many instances, a catalyst is added to the polyurethane prepolymer and curing agent to promote the reaction that forms the polyurethane.

Polyurethane elastomers have been employed in the construction of industrial rollers, such as paper mill rolls. Polyurethane elastomers have been selected for use in paper mill rolls because they exhibit advantages in load bearing capability and abrasion resistance over natural and synthetic rubber materials; this is particularly important for paper mill rolls, where they experience high dynamic loads. In some papermaking machines, the rolls are also exposed to high moisture and elevated temperatures. These conditions can cause melting or debonding of the polyurethane, thereby rendering it unsuitable for use.

Some researchers have attempted to address these problems by employing polytetramethylene ether glycol (PTMEG) as the polyol of the prepolymer. For example, International Publication No. WO94/137 22 to Rosenburg, et al., discusses a low free toluene diisocyanate (TDI) prepolymer system modified with aliphatic diisocyanate methylene bis(4-cyclohexyl isocyanate) to reduce the propensity to crack during processing. To produce high performance polyurethane elastomers with low heat build-up, the modified TDI prepolymers are cured with aromatic diamine 4,4'-methylene-bis-(3-chloro-2,6-diethyl aniline) (M-CDEA). However, these elastomer systems exhibit inferior water diffusion and water vapor transmission characteristics when compared to conventional PTMEG polyether-based systems at the same hardness.

SUMMARY OF THE INVENTION

In view of the foregoing, it is an object of the present invention to provide a polyurethane composition having high load-bearing capability, hydrolytic stability and low water vapor transmission while experiencing relatively low hysteresis during use at elevated temperatures.

It is also an object of the present invention to provide a polyurethane material suitable for use in paper mill rolls.

It is an additional object of the present invention to provide such a material that can be easily processed into paper mill rolls.

It is a further object of the present invention to provide a method for producing such a material.

These objects and others are satisfied by the present invention, which is directed to a polyurethane composition which has sound dynamic load-bearing properties, low water vapor transmission, and high hydrolytic stability, yet experiences low hysteresis at elevated temperatures and loads. The composition of the present invention comprises a diisocyanate, a polyol, a diamine curing agent, and a hydroxy-terminated polybutadiene (HTPB). Preferably, the diisocyanate and the polyol are combined as a prepolymer, and the HTPB is included with the diamine curing agent. This composition has proven to have good dynamic load bearing capabilities, low hysteresis, good hydrolytic stability, and low water vapor transmission. The composition can be formed in a variety of hardnesses as desired. As such, the composition is ideal for articles that require such properties, such as paper machine rolls.

DETAILED DESCRIPTION OF THE INVENTION

Figure 1A:
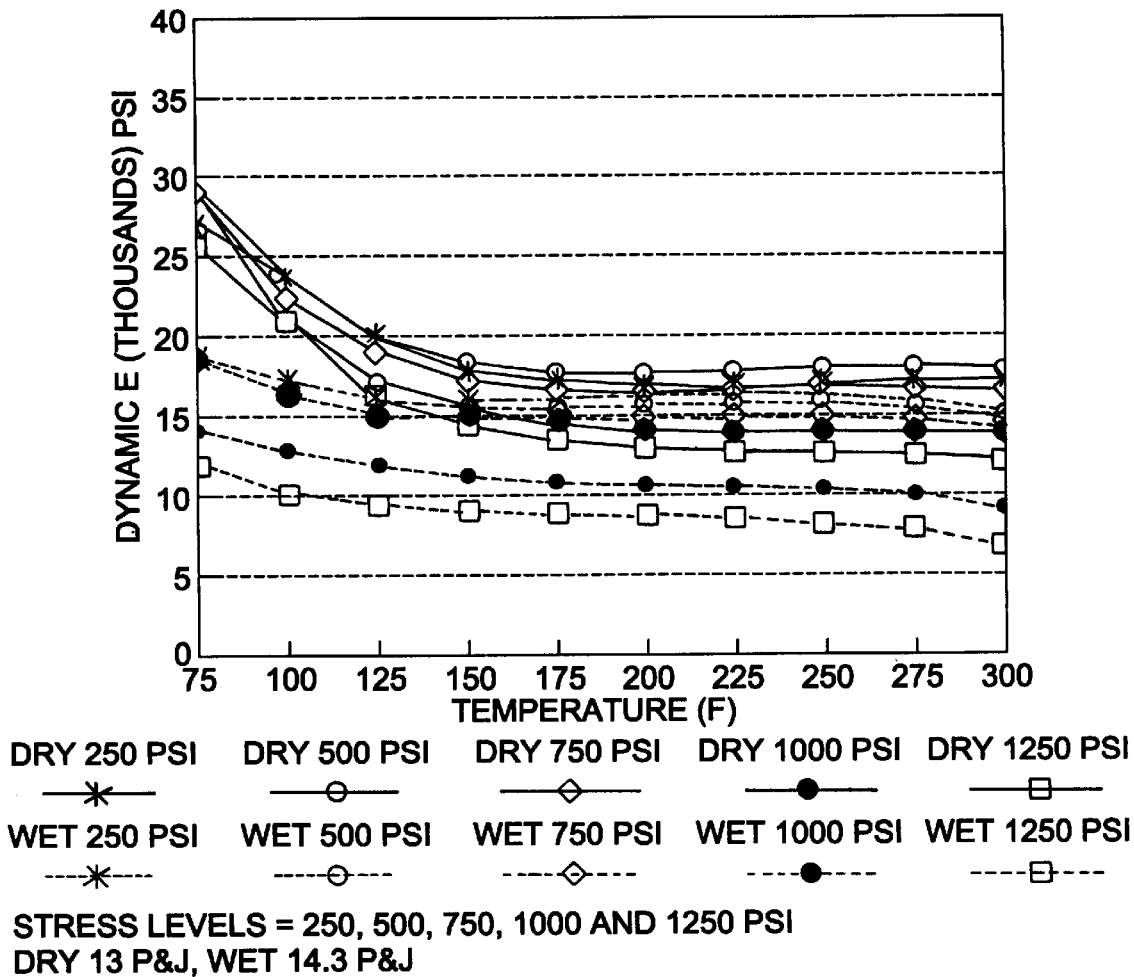
FIG. 1A is a graph plotting dynamic modulus as a function of temperature for polyurethane compounds having a Pusey & Jones hardness rating ("P&J") of 12.

The present invention will now be described more particularly hereinafter with reference to the accompanying drawings, in which present embodiments of the invention are shown. The invention may, however, be embodied in many different forms and is not limited to the embodiment set further herein; rather, these embodiments are provided so that the disclosure will fully convey the scope of the invention to those skilled in this art.

As discussed above, the present invention relates to a castable polyurethane elastomer system which comprises two components: a prepolymer component A and a curing component B. Component A includes a dilsocyanate and a polyol. Component B includes an aromatic diamine and preferably include a hydroxyl-terminated polybutadiene resin.

Specifically, the component A polyisocyanates should be isocyanate-encapped prepolymers which are the adduct of an organic diisocyanate and a long chain (i.e., high molecular weight) polyol. Suitable organic diisocyanates include aliphatic diisocyanates, such as hexamethylene diisocyanate (HDI), 1,3-xylene diisocyanate (XDI), isophorone diisocyanate (IPDI), 1,4-cyclohexane diisocyanate (CHDI), 1,1'-methylene-bis-4-(isocyanatocyclohexane) (H12MDI) and its generic isomers, and 1,1,4,4-tetramethylxylene diisocyanate in its para- or meta-isomer forms (p-TMDI, m-TMXDI). Also suitable are aromatic diisocyanates, such as toluene diisocyanate (TDI) and its geometric isomers (2,4 and 2,6 isomer mixtures), 4,4'-diphenylmethane diisocyanate (MDI), 3,3'-dimethyl-4,4'-biphenyl diisocyanate (TODI), naphthalene diisocyanate (NDI), and para-phenylene diisocyanate (PPDI). Preferred aromatic diisocyanates are TDI, MDI, and PPDI, with TDI being the most preferred. TDI is available from BASF Corporation, Mt. Olive, N.J. under the trade name TDI.

The high molecular weight polyols suitable for use in component A belong to two distinct groups: polyether polyols and polyester polyols. Suitable polyether polyols include polypropylene ether polyol (PPG), ethylene oxide capped PPG, and polytetramethylene ether glycol (PTMEG), with PTMEG being preferred. PTMEG is available from E.I. dupont de Nemours & Co., Wilmington, Del., under the tradename Tetrathane. Suitable polyester polyols include polyadipate, polycaprolactone and polycarbonate, with polycaprolactone being preferred. The polyols of component A can also include other materials, such as HTPB or hydroxyl-terminated ethylene/butylene (HTEB), which can be blended with PTMEG.

The polyisocyanates employed in component A are preferably the adducts of PPG and TDI, PTMEG and TDI, PTMEG and MDI, and PTMEG and PPDI, with PTMEG/TDI-based polyisocyanates being more preferred. If a PTMFG/TDI adduct is employed, it is preferably one having a PTMEG molecular weight of between 250 and 1,500 glmol. It should be prepared to minimize the residual free TDI content, and should typically have a NCO% content between 1.9–9.0% ("NCO%" being the measure of the weight percentage of the unreacted NCO group on TDI over the TDI prepolymer). PTMEG/TDI-based systems are available as Adiprene L-series and Vibrathanc B-series from Uniroyal Chemical Co., Middleburg, Conn. For PTMEG and MDI- or PPDI-based polyisocyanates, such systems typically have a NCO% content of between 4.0–9.0%. An exemplary PTMEG/MDI-based system is the Adiprene B-series (6%–9% NCO%), available from Uniroyal. An exemplary PTMEG and PPDI-based polyisocyanate system is available as the Adiprene PP-series (NCO between 3.5 and 6.0%; available from Uniroyal).

Suitable aromatic diamines to be employed in component B of the present invention include: 4,4'-methylene-bis-(2-chloroaniline) (MOCA, available as Curene 442 from Anderson Development, Adrian, Mich.); 4,4'-methylene-bis-(3-chloro-2,6-diethylaniline) (M-CDEA, available as Lonzacure from Lonza Corporation, Fair Lawn, N.J.); diethyl toluene diamine (DETDA, available as Ethacure 100 from Albemarle, Baton Rouge, La.); dimethylthio-toluene diamine (available as Ethacure 300 from Albemarle); trimethylene glycol di-p-amino-benzoate (available as Polacure 740M from Air Products and Chemicals, Inc., Allentown, Pa.); 1,2-bis(2-aminophenylthio)ethane (available from EniChem America, Inc., New York, N.Y.); polytetramethyleneoxide-di-paminobenzoate (available as Versalink P-250, 650, 1000, and 2000 from Air Products and Chemicals, Inc.), and tertiary butyl toluene diamine (TBTDA). The preferred aromatic diamine is MOCA.

The hydroxyl-terminated polybutadienes of component B should have a molecular weight of between about 1,000 and 2,000 glmol. Exemplary hydroxyl-terminated polybutadienes that can be used in component B of the present invention include: Polybd R20LM, R-45HT and R-45M (Elf Atochem North America, Inc., Philadelphia, Pa.), with Polybd R-20LM being preferred. DIFOL HTPB resins are also available from Amoco Chemicals, Chicago, Ill.

The curing component B can also include additional materials. For example, in one embodiment, PTMEG is blended with HTPB and MOCA to form a curing agent.

To form an effective polyurethane elastomer, the total number of —NH$_2$ groups in the aromatic diamine and the —OH groups in the hydroxyl-terminated polybutadiene components of component B should be about equal to the number of —NCO groups in the polyisocyanate component A, although some deviation is permissible. The composition typically comprises component B being about 80%–110% of the stoichiometric equivalent of component A. The diamine component of component B can be about 5%–95% by weight of component B and the HTPD component can be about 95%–5% by weight of component B.

Preferred compositions include 100 pph PTMEG and TDI-based polyisocyanate as component A and about 30–45 pph of component B, wherein component B comprises about 10%–50% MOCA and about 90%–50% Polybd R-20LM. The desired stoichiometry for such compositions is between about 90%–100%.

Exemplary compositions of the present invention are set forth in Table 1.

TABLE 1

Exemplary Polyurethane Compositions

| Composition No. | PTMEG/TDI prepolymer* | MOCA (g) | Polybd (g) | P & J Hardness |
|---|---|---|---|---|
| 1 | 100 g | 18.62 | 18.54 | 12 |
| 2 | 100 g | 16.29 | 27.81 | 15.1 |
| 3 | 100 g | 14.80 | 14.74 | 18.2 |
| 4 | 100 g | 12.95 | 22.12 | 21 |
| 5 | 100 g | 9.25 | 35.02 | 28.2 |
| 6 | 100 g | 9.30 | 36.9** | 30.1 |

The P & J (Pusey & Jones) rating is the hardness rating used in the paper industry that is measured via a Plastometer, (Model 1000, Hobbs & Warren, Boston, Massachusetts) according to ASTM D531-89 method.
*95% stoichiometry of prepolymer (Component A) to curing agent (Component B)
**This compound also includes 6.53 g of PTMEG mixed with Polybd.

In an alternative composition, component A is PTMEG/TDI-based polyisocyanate blended with HTPB/TDI. This mixture is then reacted with a diamine, such as MOCA, to yield polyurethane elastomers. The blend ratios are in the range of about 90%–50% of PTMEG/TDI to HTPB/TDI. The component B diamine has a stoichiometric equivalent range of about 80%–110% to component A (preferably about 90%–100%).

The polyurethane composition of the present invention exhibits dynamic load-bearing properties, hydrolytic stability, low water vapor transmission, and low hysteresis to make it a useful material in paper machine rolls. In addition, the composition can be employed in articles for which such properties are desirable, such as other types of rolls, industrial piping and valves, protective coatings for elevated temperature and/or humidity environments, washing machine components, and the like.

The invention will now be described in greater detail in the following non-limiting examples.

EXAMPLE 1

Configuration of Mold for Forming Test Rolls

Figure 21:
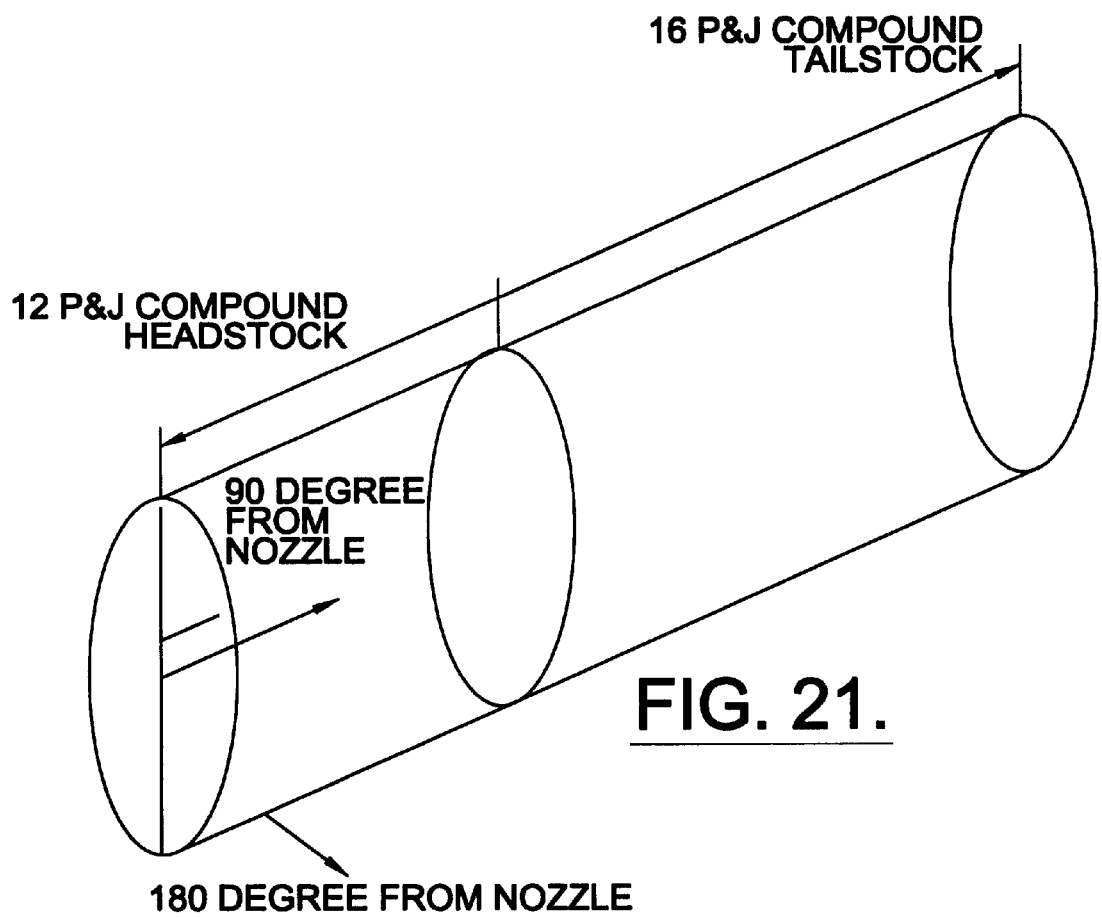
FIG. 21 is a schematic illustration of the test mold used to construct the two-part paper roll used in testing of polyurethane compositions of the present invention.

A sample roll for testing of the polyurethane compositions of the present invention was made using the mold shown in FIG. 21. The cylindrically-shaped mold outer cover was sized and secured to form a ¾ inch gap between the core and the outer cover within which a roll could be molded. The mold had a roll face approximately 129 inches long, with an inner diameter of approximately 29 inches and an outer diameter of approximately 30.5 inches.

Two sets of thermocouples were located approximately 30 inches from the tailstock can and situated 90° and 180° apart from the nozzle area to monitor processing temperature conditions for the portion of the roll formed in the headstock portion of the mold. The other two sets of thermocouples were located 20 inches from the headstock can in similar 90° and 180° positions to monitor the temperature of the portion of the roll formed in the tailstock portion of the mold.

Each set of thermocouples consisted of three individual thermocouples positioned at the base, in the middle, and near the outer cover of the mold. For monitoring purposes, each thermocouple was assigned a number: 0, 1, and 2 for the base, center, and surface headstock 180° thermocouples; 3, 4, and 5 for the headstock 90° set; 6, 7, and 8 for the tailstock 180° set; and 9, 10, and 11 for the tailstock 90° set. The exothermic temperature at each location was taken from the middle thermocouple such as 1, 4 for the headstock and 7, 10 for the tailstock.

EXAMPLE 2

Forming of Test Rolls

To compare the polyurethane compositions of the present invention with standard polyurethane compounds made with conventional PTMEG/TDI prepolymers cured with industry standard MOCA, a two-part test roll was formed made with two hydroxyl-terminated polybutadiene-modified polyurethane compounds. The first, labelled as "Roll Composition 1" in Table 1, consisted of the components listed therein. Roll Composition 1 was molded in the tailstock portion of the mold. The second compound, labelled as "Roll Composition 2" in Table 1, consisted of the components listed therein. Roll Composition 2 was molded in the headstock portion of the mold.

Roll Compositions 1 and 2 were made in the same molding trial by altering the ratios of the curing agent components in the premix before the premix was fed into the mold via the nozzle. The sample roll took approximately 35 minutes to cast, with the mixture being fed in at a 4 in./min. rise rate.

Figure 16:
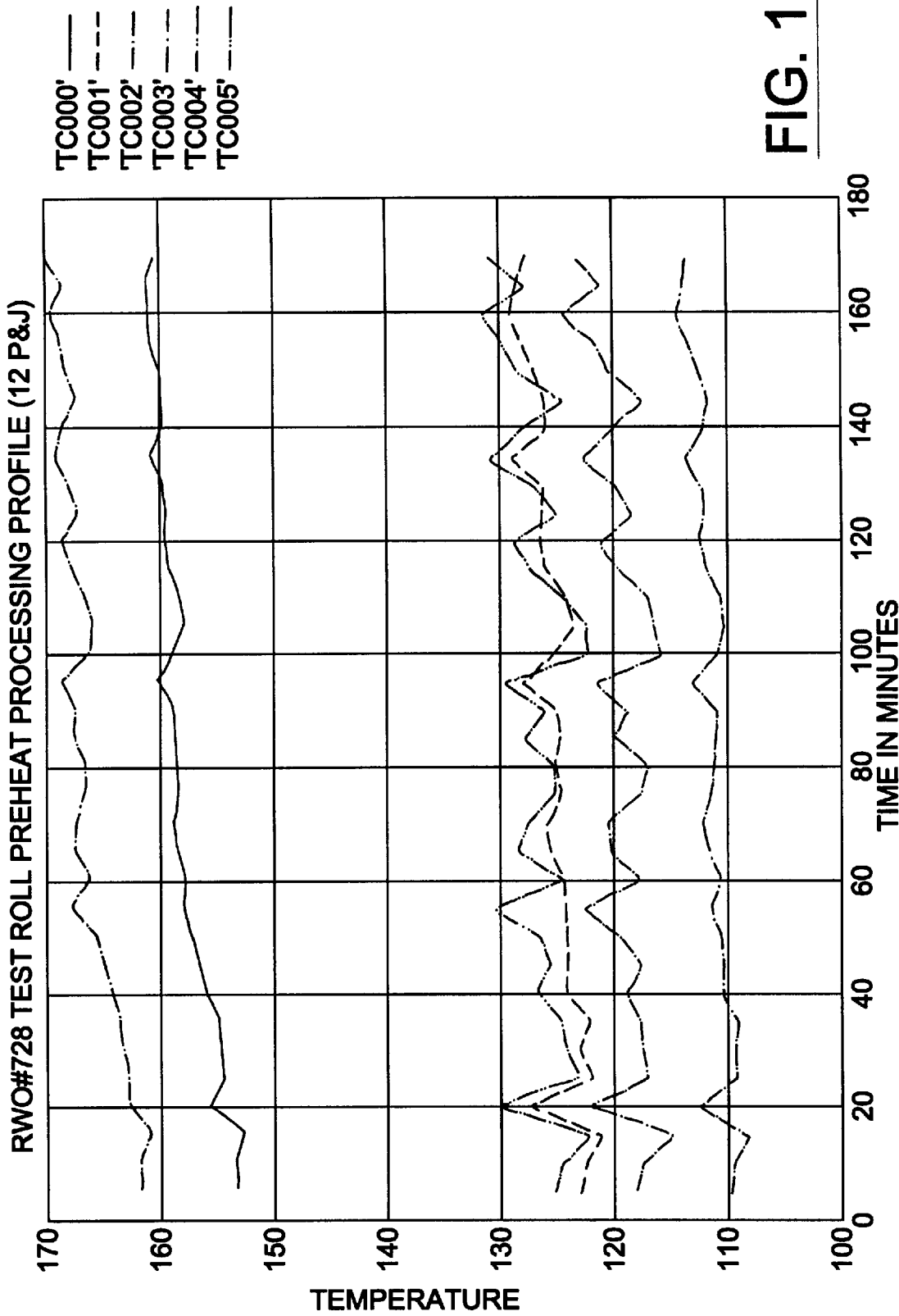

The temperature profiles illustrated in FIGS. 15 through 20 depict the temperature changes monitored throughout the sample roll processing. It can be seen from the tailstock preheat profile (FIG. 15) that the temperatures in the middle and near the outer surface of the roll are more than 20° F. lower the temperature at the base. As seen in FIG. 16, the headstock exhibited a similar temperature profile; however, the temperatures in the middle and near the surface were about 30° F. higher than that of the tailstock and 10° F. higher at the base.

Figure 17:
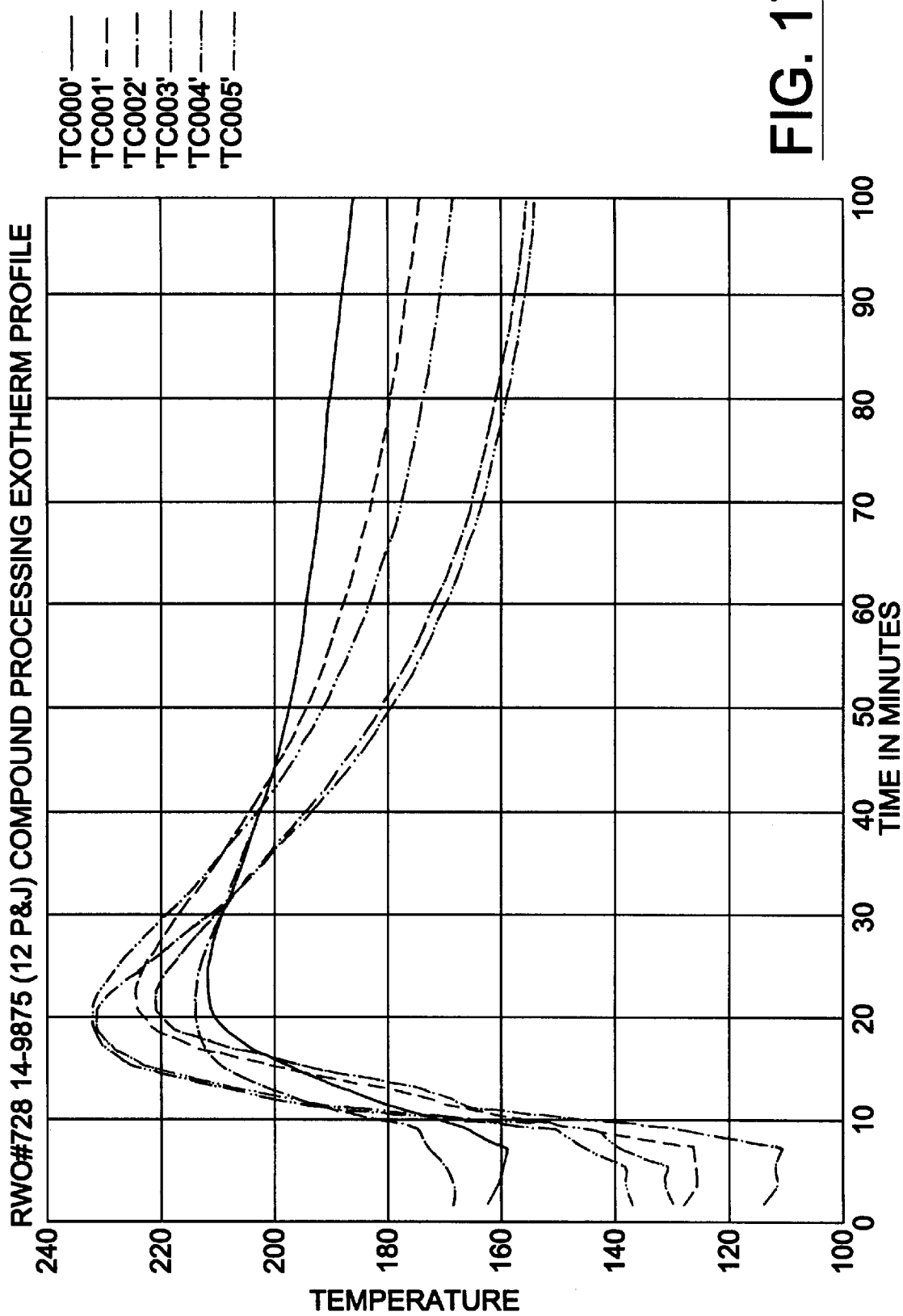
FIGS. 17 and 18 are graphs plotting exotherm temperature as a function of time for the thermocouples shown in FIG. 21.
Figure 18:
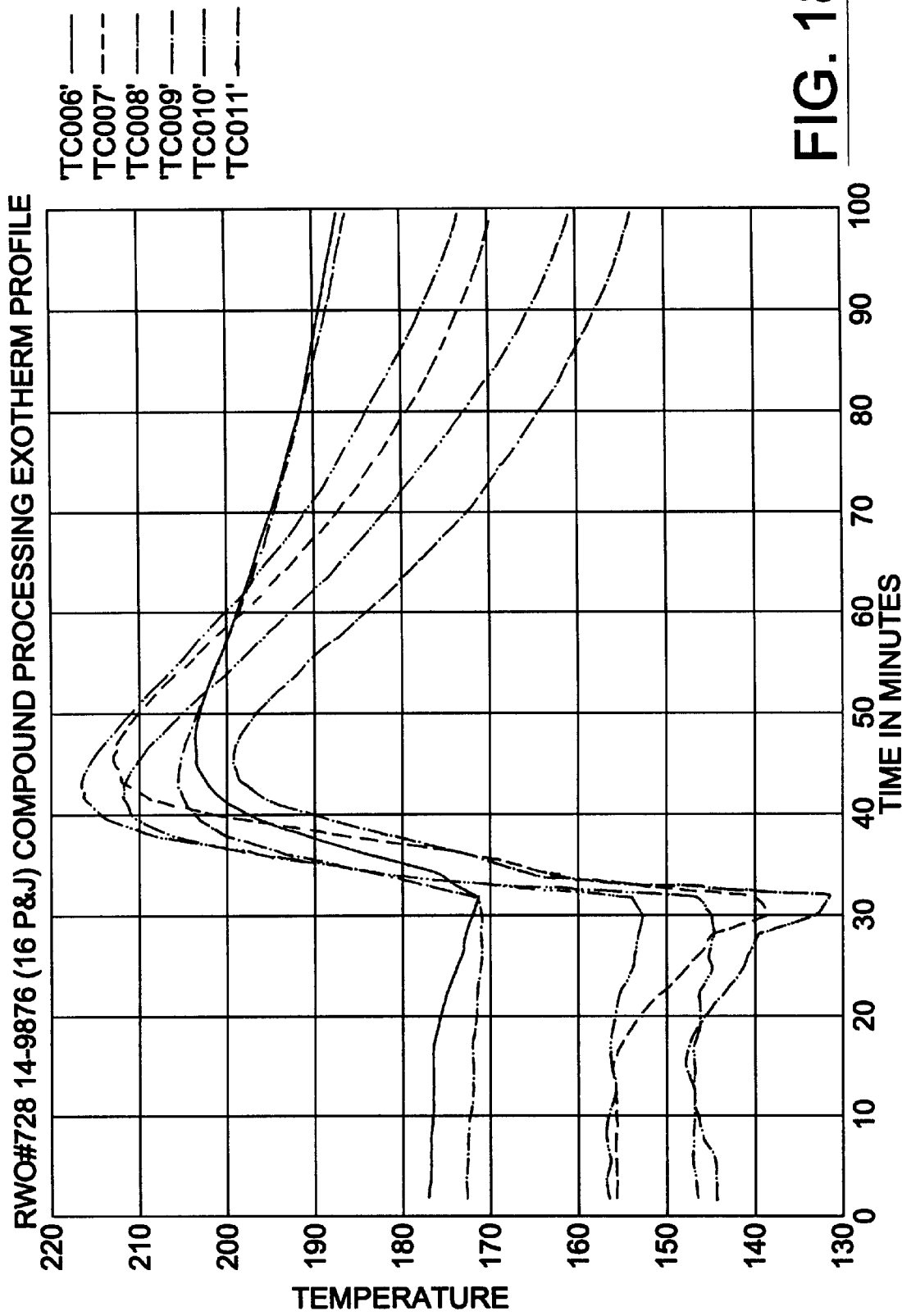

The exothermic temperature profiles obtained during processing are shown in FIGS. 17 and 18. As shown in the figures, the exothermic temperatures of the Roll Composition 1 were 232° F. at the 90° thermocouple location and 225° F. at the 180° location. The exothermic temperatures of the Roll Composition 2 were 216° F. at the 90° location and 213° F. at the 180° location.

Figure 19:
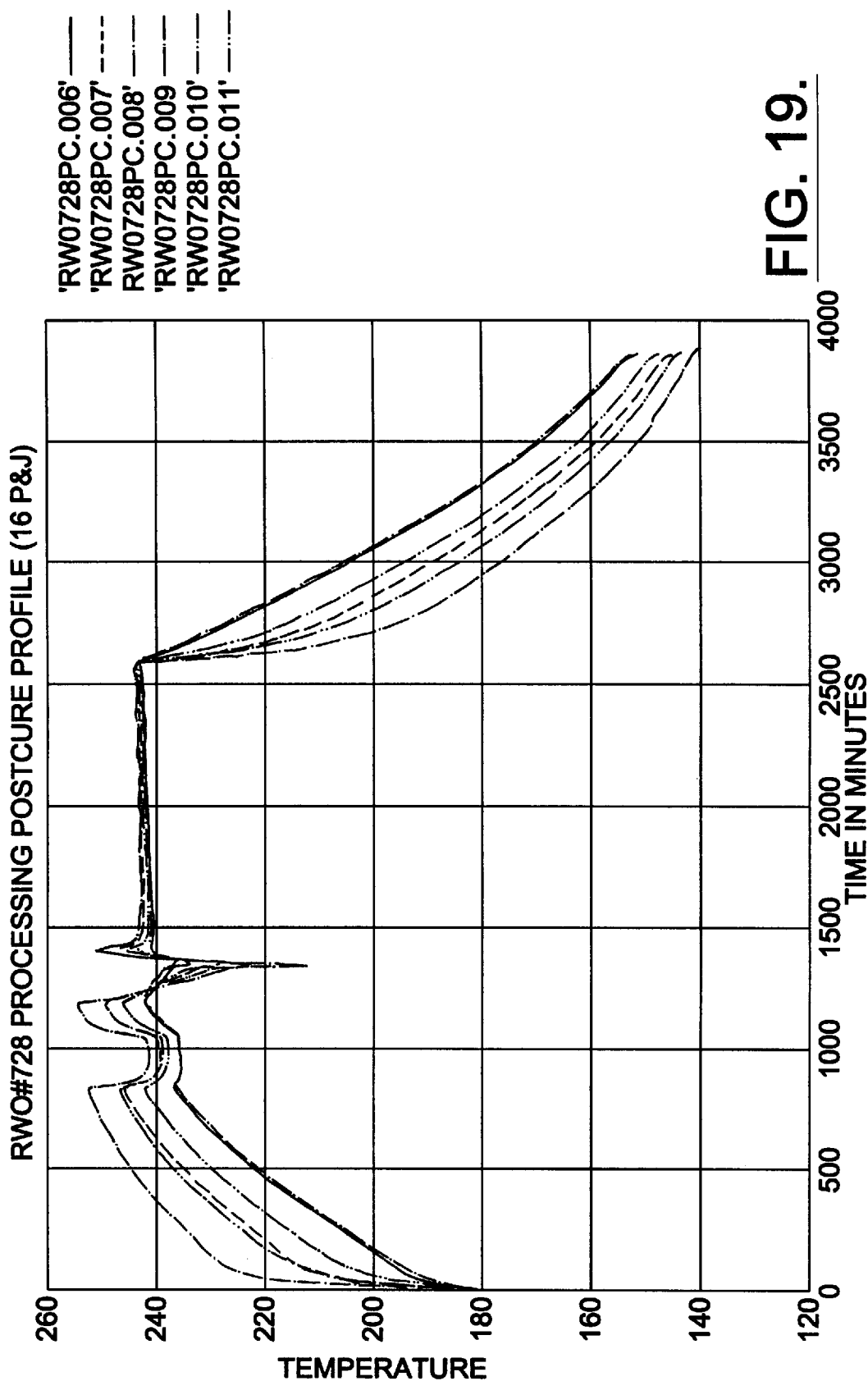
FIGS. 19 and 20 are graphs showing post cure temperature as a function of time for the thermocouples of FIG. 21.
Figure 20:
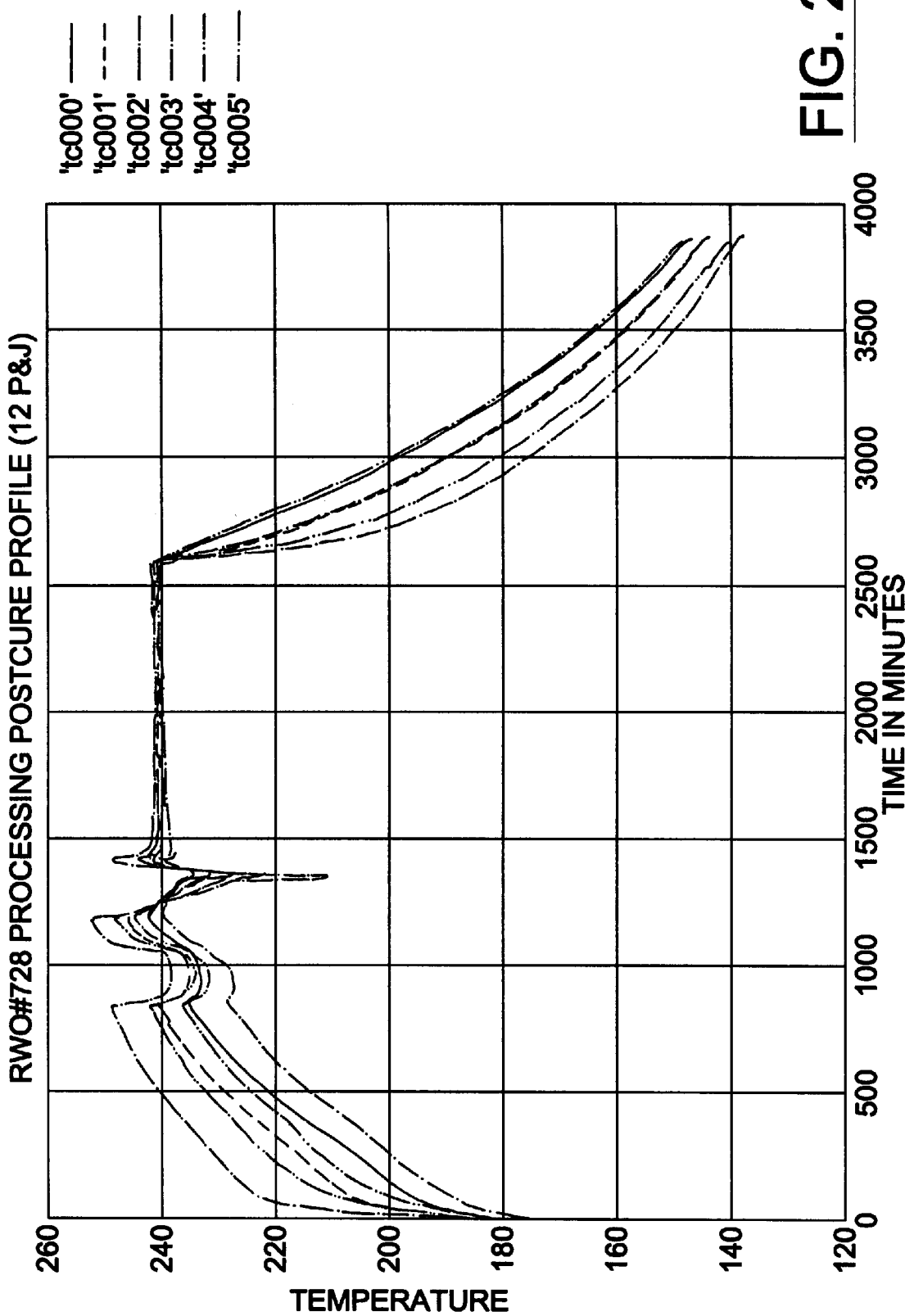

The sample roll also received a postcure treatment at 240° F. for 20 hours. The postcure temperature profiles are shown in FIGS. 19 and 20 for the Roll Compositions 1 and 2, respectively. It should be noted that fluctuations seen in the temperature readings were the result of a power outage that occurred during the postcure period.

EXAMPLE 3

Testing of Dynamic Properties

A. MTS Testing

The dynamic properties of the Roll Compositions 1 and 2 were tested using standard MTS test procedures and equipment. Samples of the Roll Composition 1 were tested at stress levels of 250, 500, 750, 1000, and 1250 psi. Testing was conducted on both dry and wet samples; the wet samples were prepared by immersion in 150° F. water for four weeks. Wet and dry samples of the Roll Composition 2 were tested at stress levels of 100, 300, 500, 700, and 900 psi. In both instances, the temperature range for testing was 75 to 300° F.

Figure 1B:
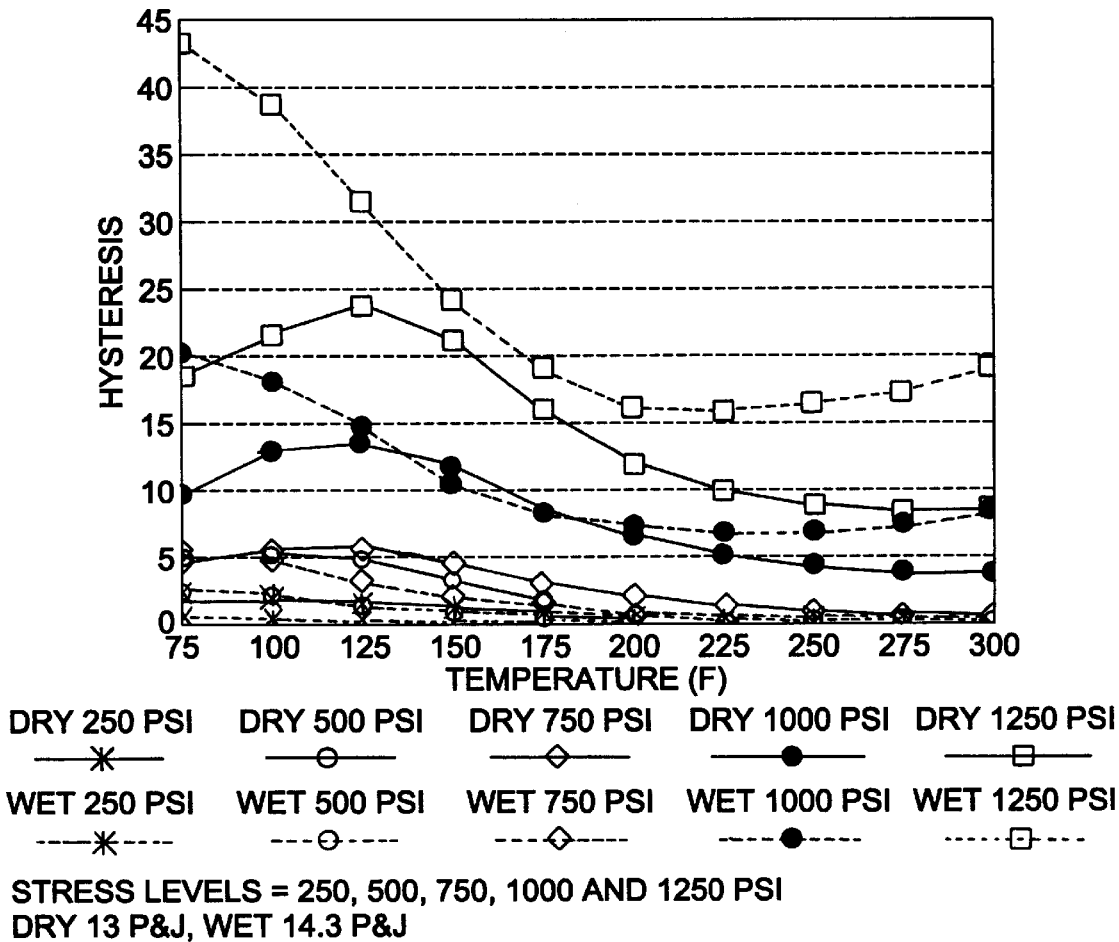
FIG. 1B is a graph of plotting hysteresis as a function of temperature for 12 P&J compounds.

FIGS. 1a and 1b show the MTS testing results (Roll Composition 1 is identified as such therein). As shown, the dry moduli, for tests at conducted at stress levels of 750 psi and lower, are all very close in value; these values drop with increases in load (i.e., above 1000 psi). Similar behavior is shown in the wet dynamic moduli versus the temperature profiles, which indicate stable moduli over the range of temperatures tested. FIG. 1b illustrates that, in both wet and dry testing, the hysteresis of this compound is very low at lower stress levels and increases dramatically at 1000 and 1250 psi.

Figure 2:
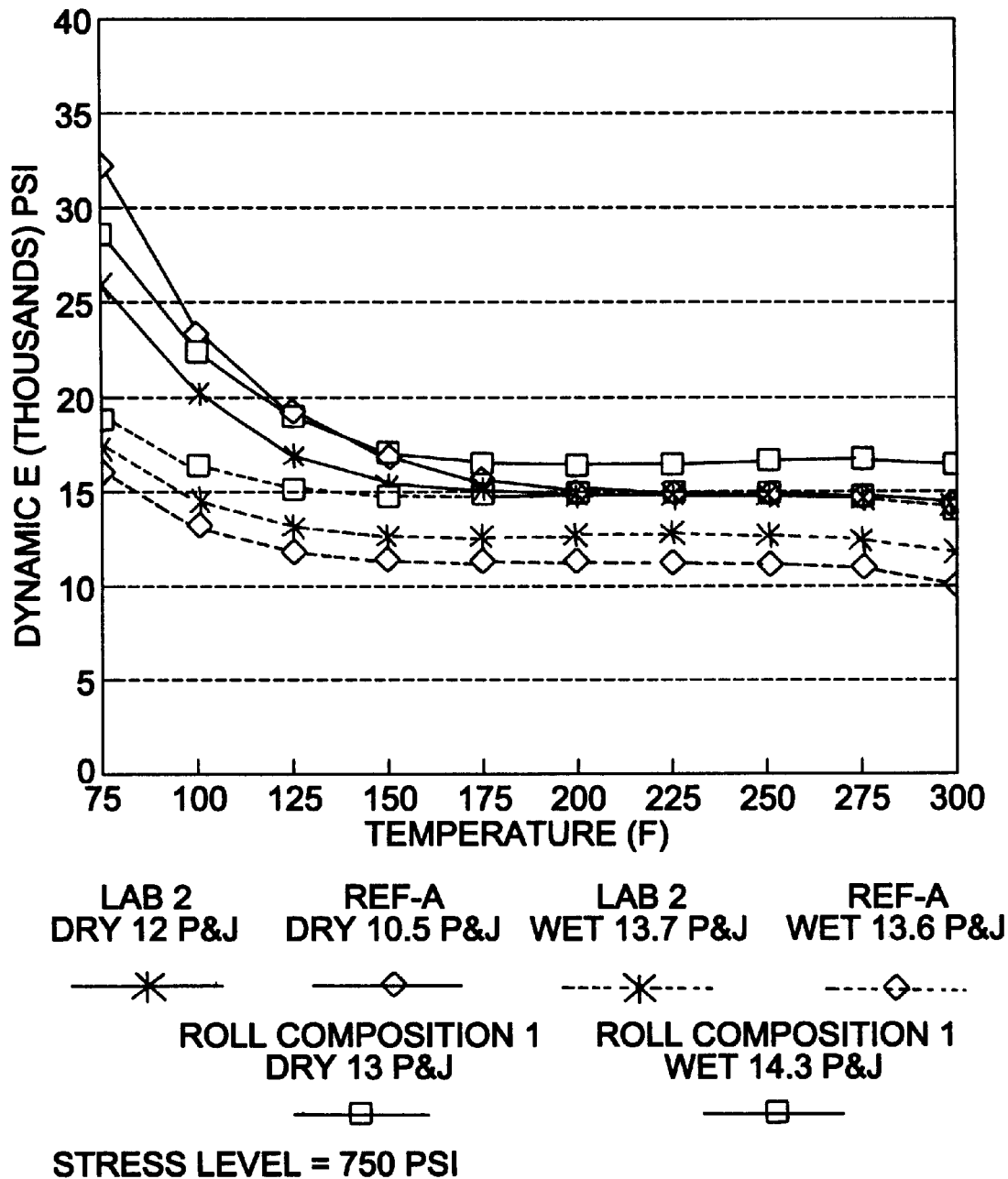
FIG. 2 is a graph plotting modulus as a function of temperature for both wet and dry 12 P&J compounds at a stress level of 750 psi.
Figure 3:
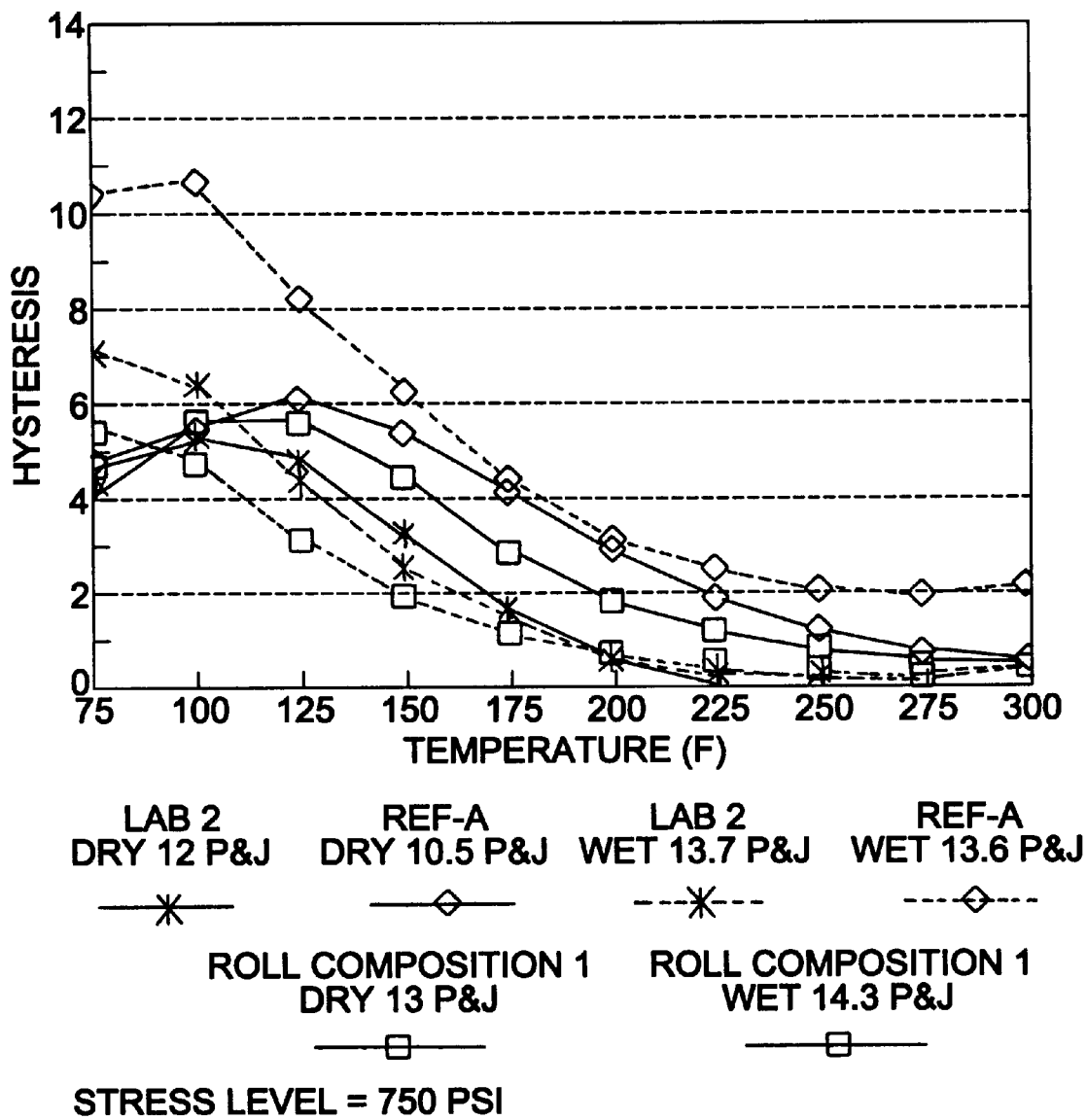
FIG. 3 is a graph plotting hysteresis as a function of temperature for both wet and dry 12 P&J compounds at a stress level of 750 psi.

FIGS. 2 and 3 compare the dry and wet dynamic moduli and the hysteresis of the Roll Composition 1 with a sample formed of the same compound cast in the laboratory (labelled "lab 2"), and a reference 12 P&J polyurethane compound (labelled Ref-A) formed of PTMEG/TDI and MOCA. Testing was conducted at a stress level of 750 psi. FIG. 2 shows that the Roll Composition 1 has a higher dynamic moduli than the lab cast sample. Both of these samples exhibit more stable moduli than the standard compound Ref-A. The dry hysteresis results of Roll Composition 1 are slightly higher than that of the lab cast sample, while the wet moduli of both samples are all significantly lower than the standard compound.

Figure 8A:
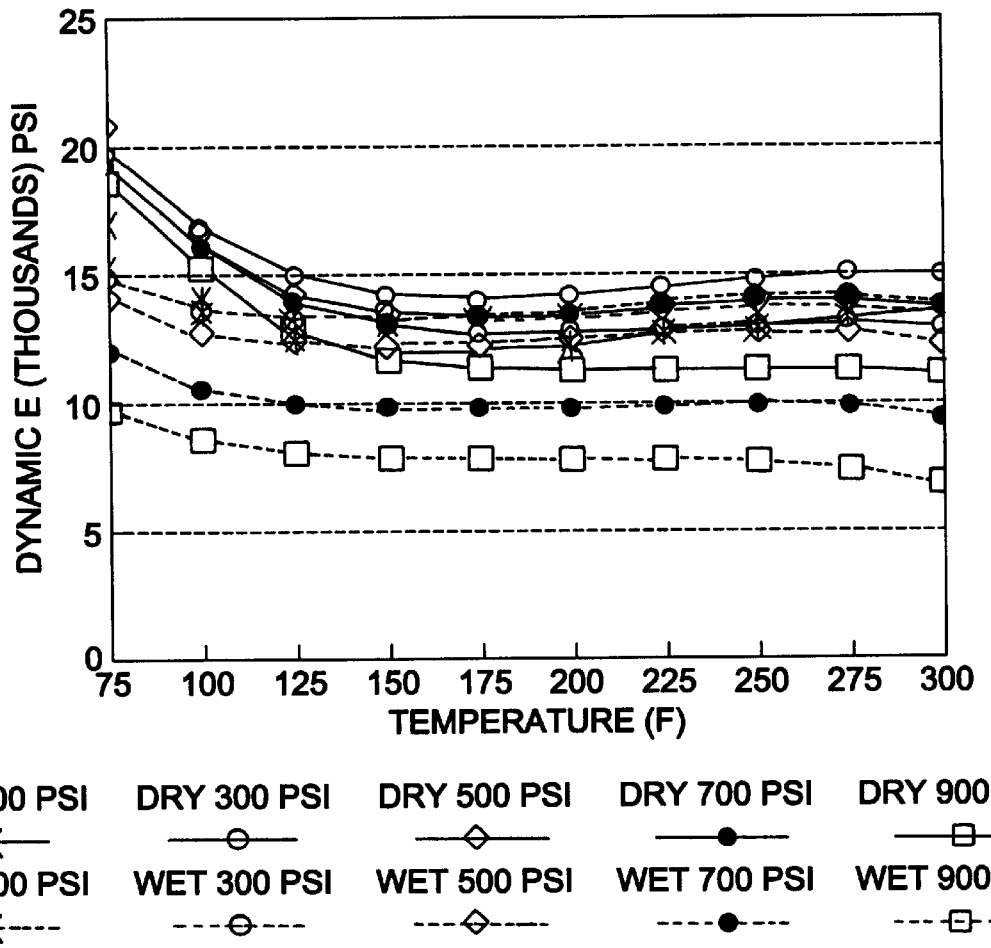
FIG. 8A is a graph plotting dynamic modulus as a function of temperature for 16 P&J compounds.
Figure 8B:
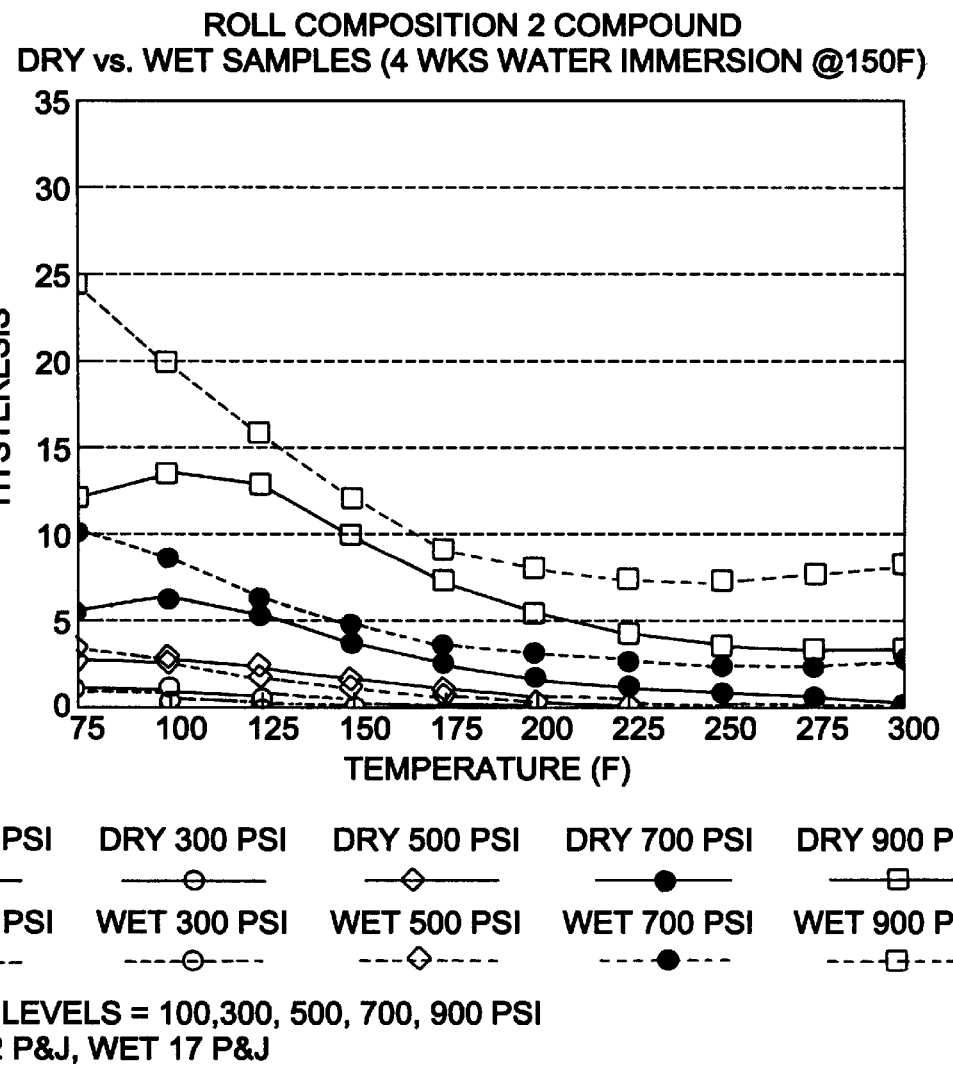
FIG. 8B is a graph plotting hysteresis as a function of temperature for 16 P&J compounds.

FIGS. 8a and 8b illustrate the MTS testing results of Composition 2 (identified as such therein). The dynamic moduli of the dry samples are not significantly different than those of the wet samples. The hysteresis results are very low for both wet and dry samples until the stress level reaches 900 psi.

Figure 9:
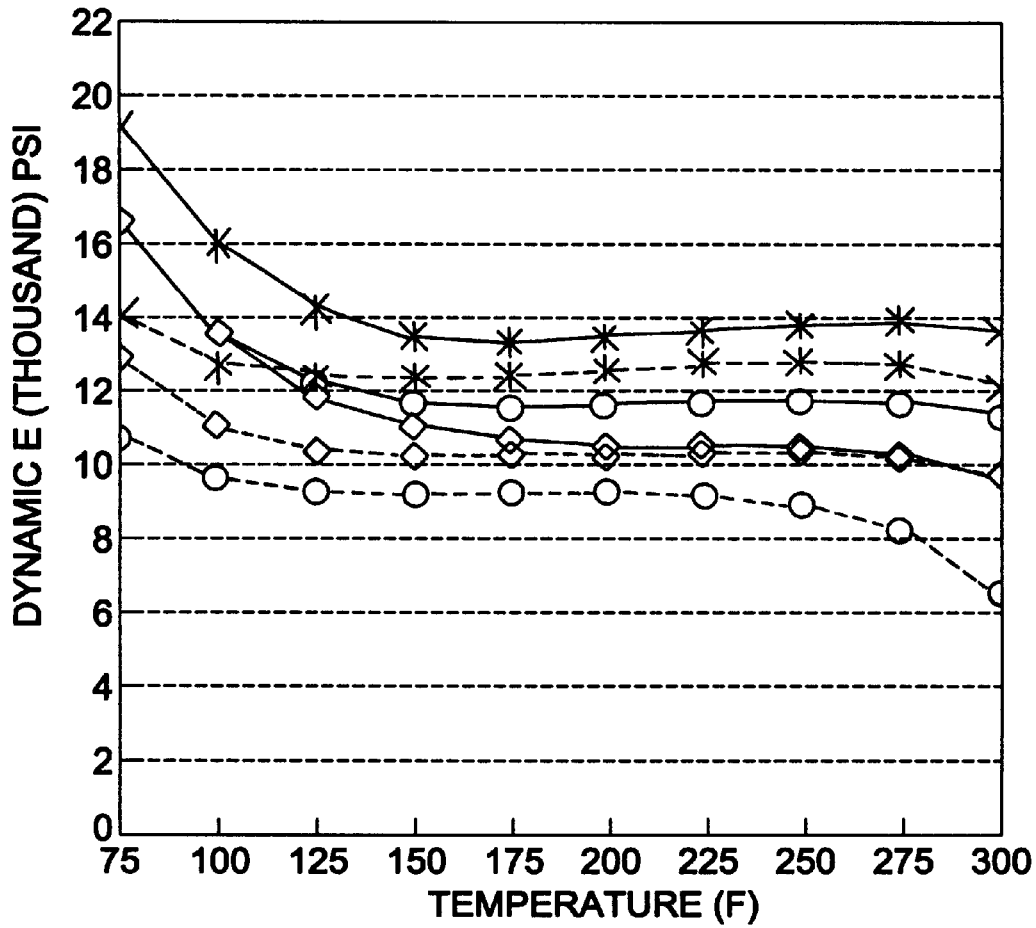
FIG. 9 is a graph plotting dynamic modulus as a function of the temperature for both wet and dry 16 P&J compounds at a stress level of 500 psi.
Figure 10:
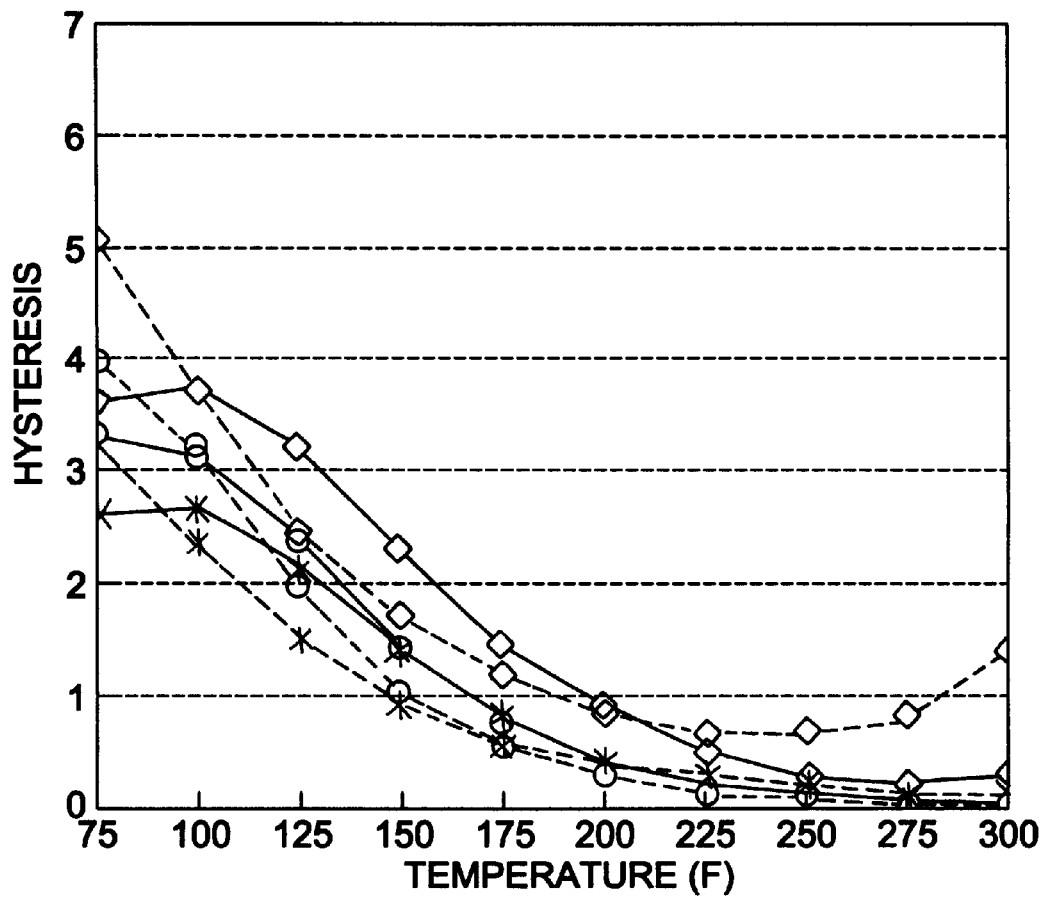
FIG. 10 is a graph plotting hysteresis as a function of temperature for both wet and dry 16 P&J compounds at a stress level of 500 psi.

FIGS. 9 and 10 compare the dry and wet moduli and hysteresis of the Roll Composition 1 at 500 psi compared to those of a laboratory-cast sample of the same compound (identified therein as "lab 3"), and those of a reference 16 P&J compound (labelled Ref-B) formed of PTMEG/TDI and MOCA. As with the 12 P & J compounds, the Roll Composition 2 showed higher dry and wet dynamic moduli than the lab cast version. Both the Roll Composition 2 and the lab cast version have dynamic moduli readings that are higher and relatively more stable than those of the Ref-B compound. The hysteresis results show similar behavior; the Roll Composition 2 has the lowest dry and wet hysteresis (FIG. 10).

B. Dynamic Mechanical Analysis

Dynamic Mechanical Analysis (DMA) was performed to further investigate the dynamic properties of both Roll Compositions 1 and 2. The testing apparatus and procedure conformed to the requirements of ASTM D4065-82 with slight modifications. The parameters of the test were an induced strain value of 0.0002, a frequency of 1 rad/sec, a temperature range of 25–190° C. at a 5° C./min. heating rate, and a heat equilibration duration prior to testing of 120 seconds.

DMA testing results reveal that both Roll Compositions 1 and 2 have lower energy loss (which is indicative of lower hysteresis) than their respective corresponding standard compounds. Their storage moduli are also higher than that of the standard compounds.

EXAMPLE 4

Hardness Testing

A. P & J Hardness Testing

Under conditions specified in ASTM D531-89, the P&J hardness of the cover sections of the Roll Compositions 1 and 2 provided readings of 12.2 and 15.1 P&J respectively. Quality control buttons formed of the Roll Compositions 1 and 2 were consistent with those of the test roll (12 and 15.2 P&J respectively).

Figure 4A:
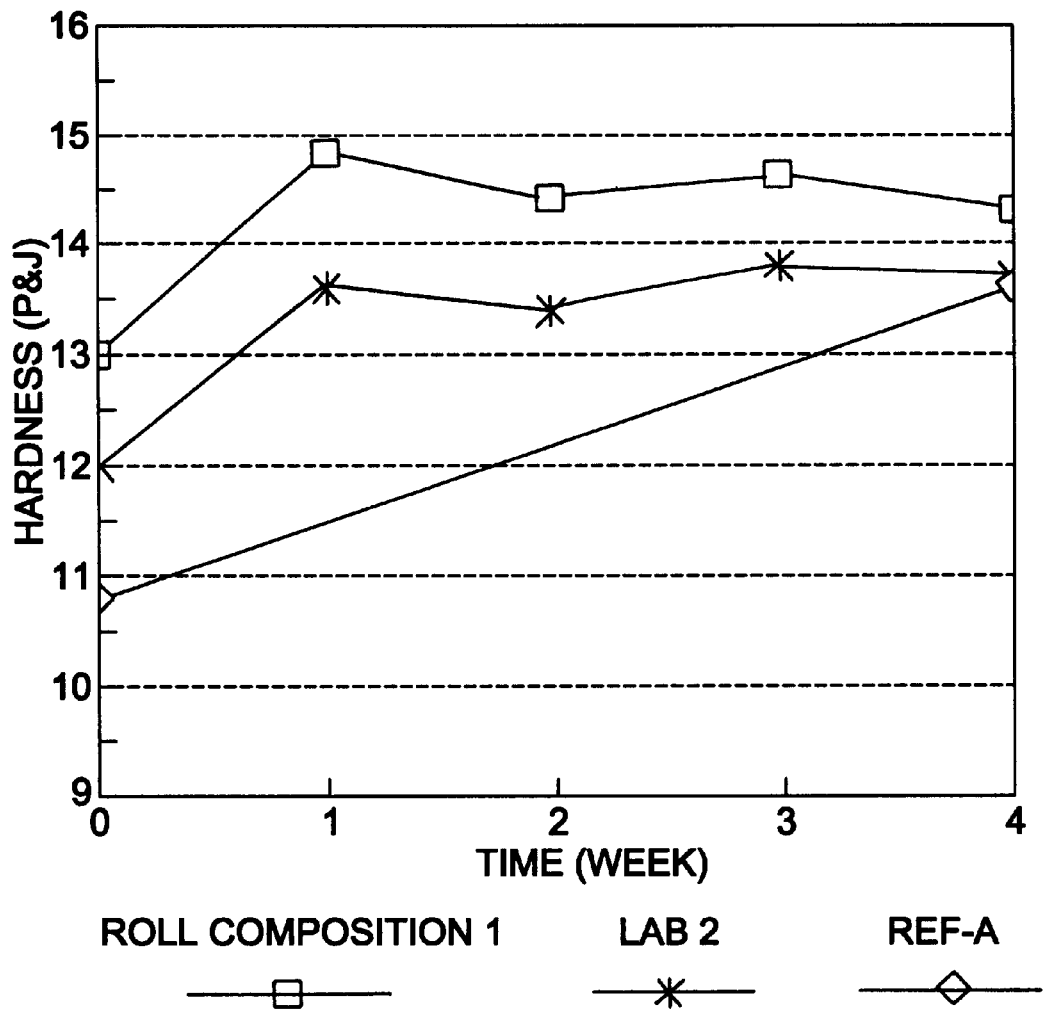
FIG. 4A is a graph plotting P&J hardness as a function of water immersion time for 12 P&J compounds.

FIG. 4a shows the P&J hardness change versus immersion time in 150° F. water for the Roll Composition 1, the lab 2 compound and the reference A 12 P&J compound. The Roll Composition 1 and the lab cast version sample have similar hardness change profiles, with P&J changes of 1.3 and 1, respectively, after four weeks of immersion. The reference A compound has a 3.1 P&J change.

Figure 11A:
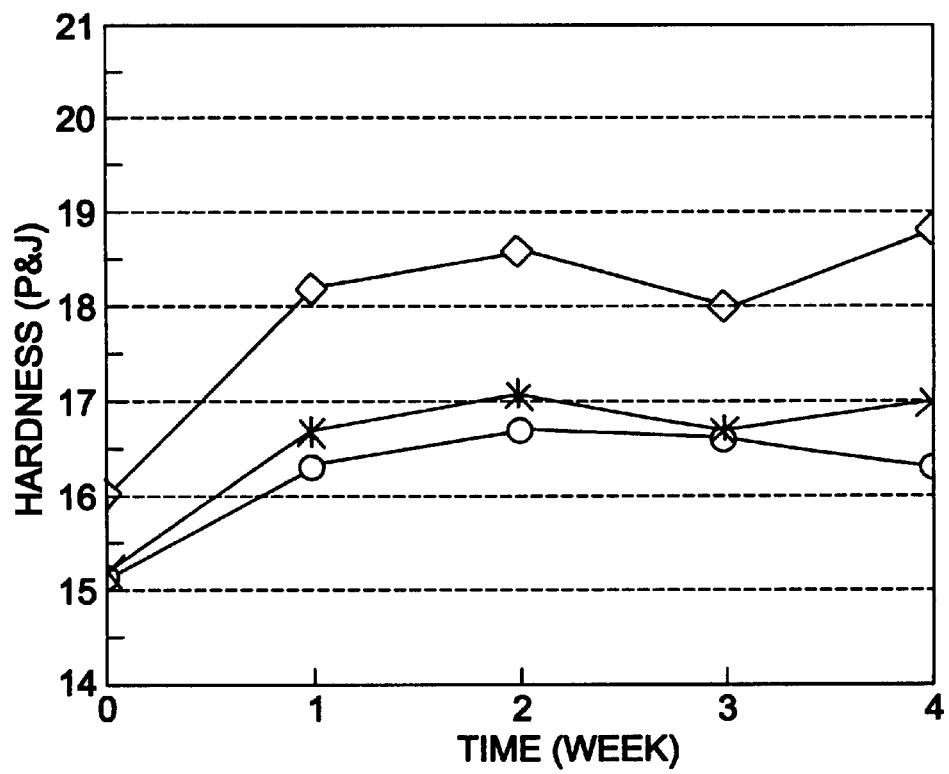
FIG. 11A is a graph plotting P&J hardness as a function of water immersion time for 16 P&J compounds.

FIG. 11a shows the P&J hardness versus immersion time profiles of the Roll Composition 2, the lab 3 compound, and the Ref-B compound. The Roll Composition 2 data are consistent with the lab cast version data. Both show less than 2 P&J point changes, whereas the reference B compound has about a 3 P&J point change.

B. Shore Hardness Testing

Shore Hardness testing was conducted on the polyurethanes of the present invention with durometers supplied by Shore Instrument and Mfg. Co., Inc. The measurement were made in accordance with ASTM D 2240. Both Shore A and Shore D durometers were used. Typically, Shore A (ShA) readings are preferred up to a reading of 95; for harder materials above this level, Shore D (ShD) readings are preferred. Both dry samples and samples immersed in 150° F. water for increasing periods of time were tested.

Figure 4B:
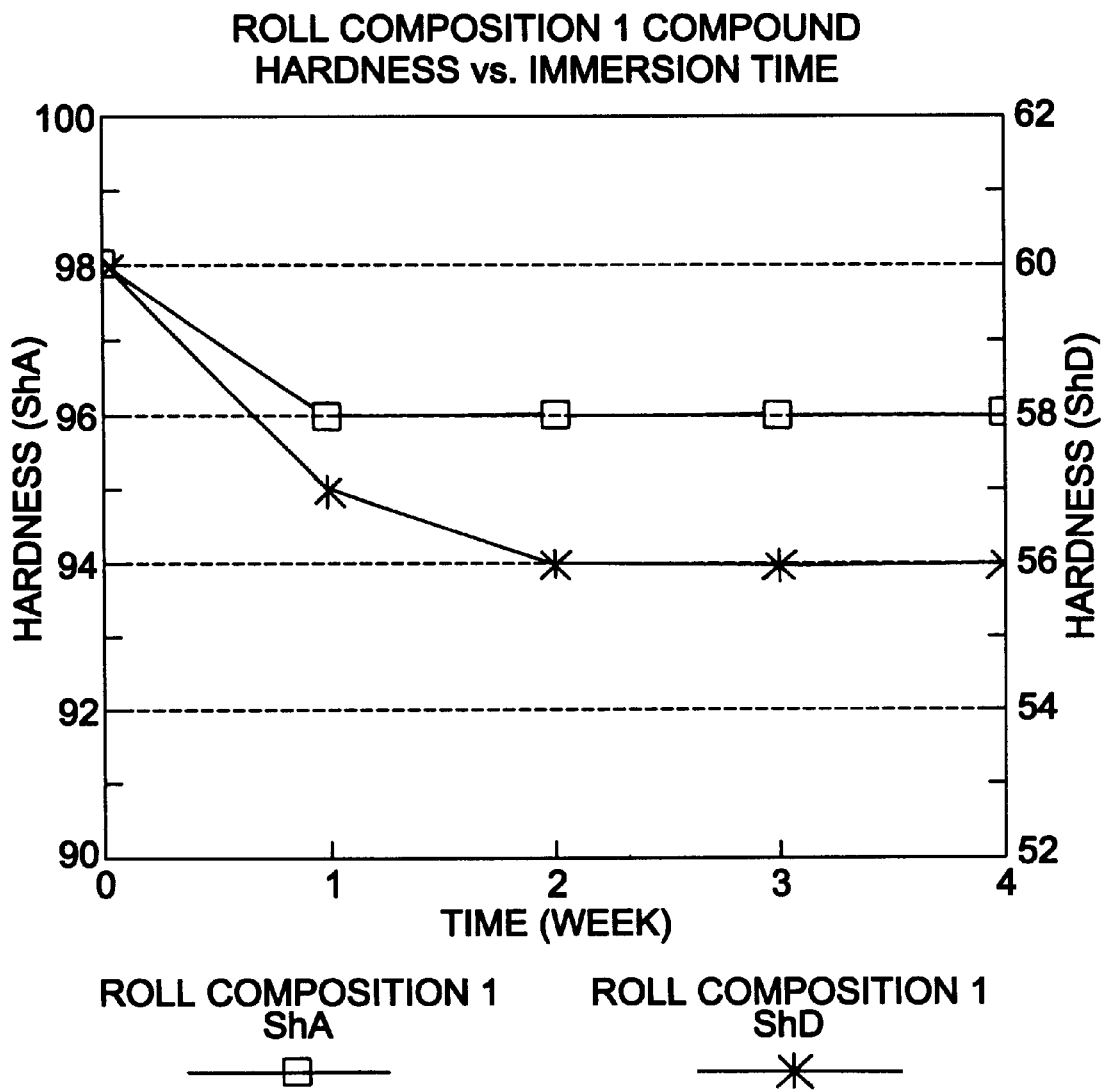
FIG. 4B is a graph plotting Shore A and Shore D hardness as a function of water immersion time for 12 P&J compounds.

FIG. 4b shows the ShA and ShD hardness changes as a function of immersion time for the Roll Composition 1. It can be seen that the changes in Shore A hardness with increasing immersion time are less than that for Shore D hardness.

Figure 11B:
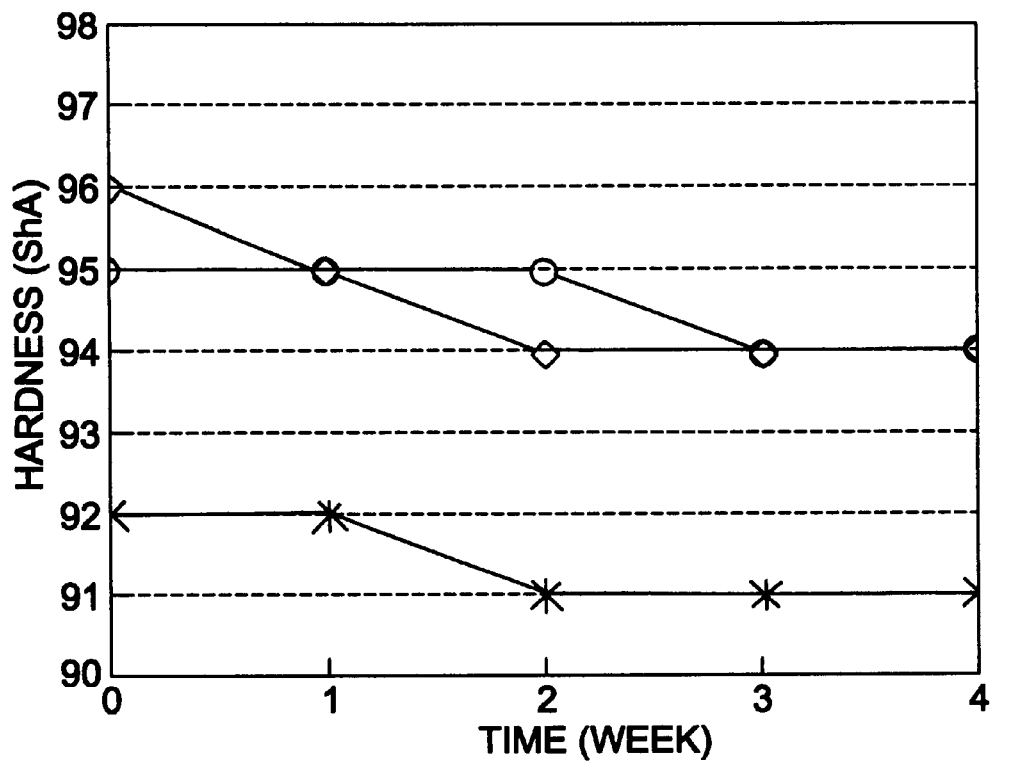
FIG. 11B is a graph plotting Shore A hardness as a function of water immersion time for 16 P&J compounds.

In FIG. 11b, the ShA hardness changes during the four weeks of immersion for the Roll Composition 2, the lab compound, and the reference B compound are shown. Both the Roll Composition 2 and the lab cast version sample have a 1 ShA level change over the range of immersion times tested, while the reference B compound has a 2 ShA level change.

C. Hardness as a Function of Temperature

The change in P & J and Shore A hardness as a function of temperature was also investigated. Samples to be tested were placed in a heated oven for hardness reading taken from room temperature to 250° F. at 25° F. intervals. They were then subjected to the appropriate hardness test.

Figure 5:
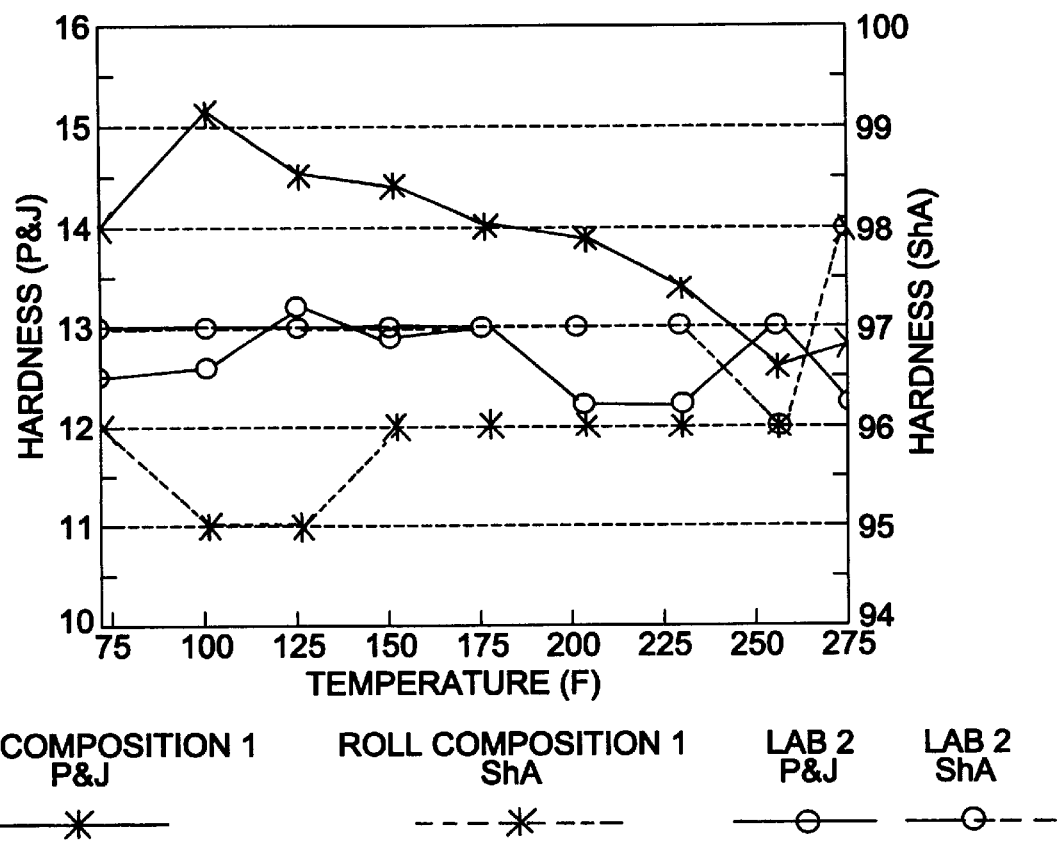
FIG. 5 is a graph plotting P&J hardness and Shore A hardness as a function of temperature for 12 P&J compounds.

FIG. 5 illustrates the change in hardness of the Roll Composition 1 as a function of temperature. The Composition 1 samples seem to be slightly less stable than the lab cast sample. Nevertheless, the hardness of the Composition 1 samples in both P&J and ShA testing returned to their original readings at room temperature after the heat aging.

Figure 12:
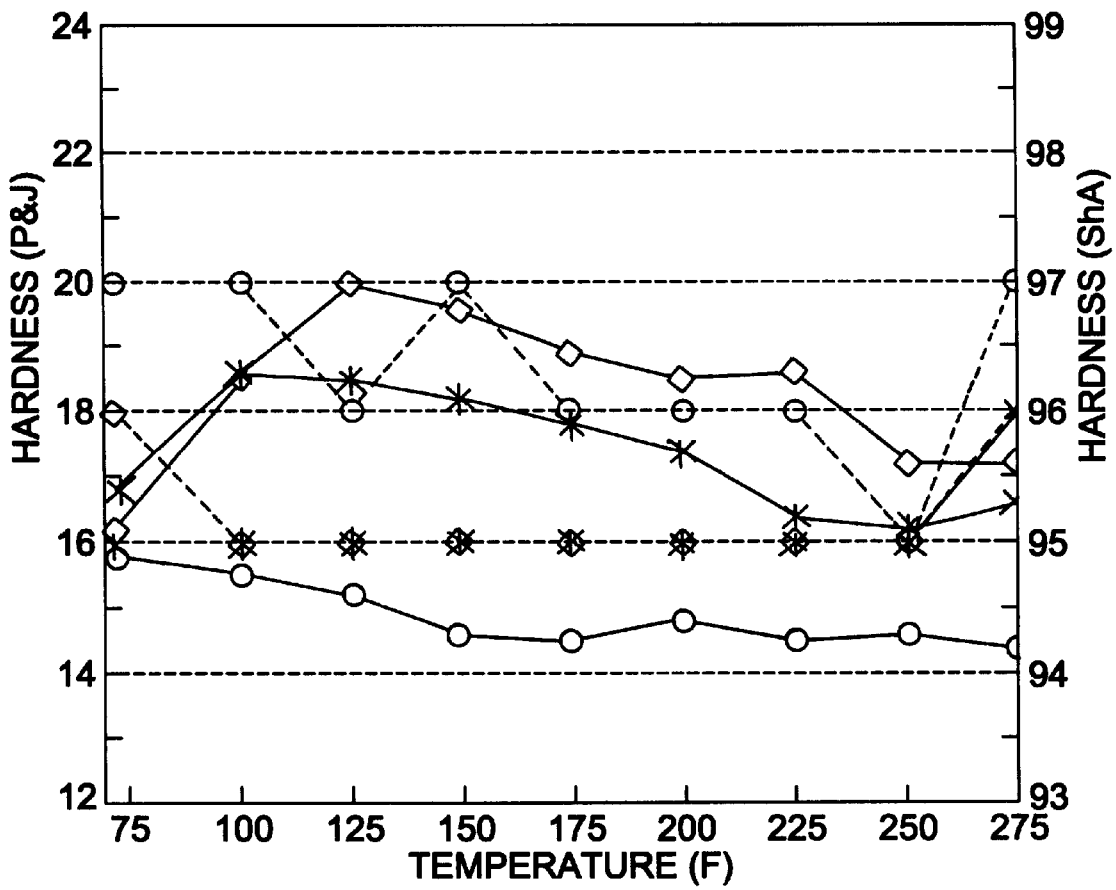
FIG. 12 is a graph plotting P&J hardness and Shore A hardness as a function of temperature for 16 P&J compounds.

In FIG. 12, hardness stability versus temperature profiles for the 16 P & J compounds are shown. The Roll Composition 2 profile is similar to that of the reference B compound but is more stable than the lab cast compound.

EXAMPLE 5

Water Vapor Transmission Testing

Water vapor transmission (WVT) testing was conducted on machined WVT sheet samples from the test roll cover samples of Roll Compositions 1 and 2. Samples were exposed to 152° F. at 90% RH and weighed periodically for about five days. The increase in weight represented the amount of water vapor transmitted through the sample.

Figure 6:
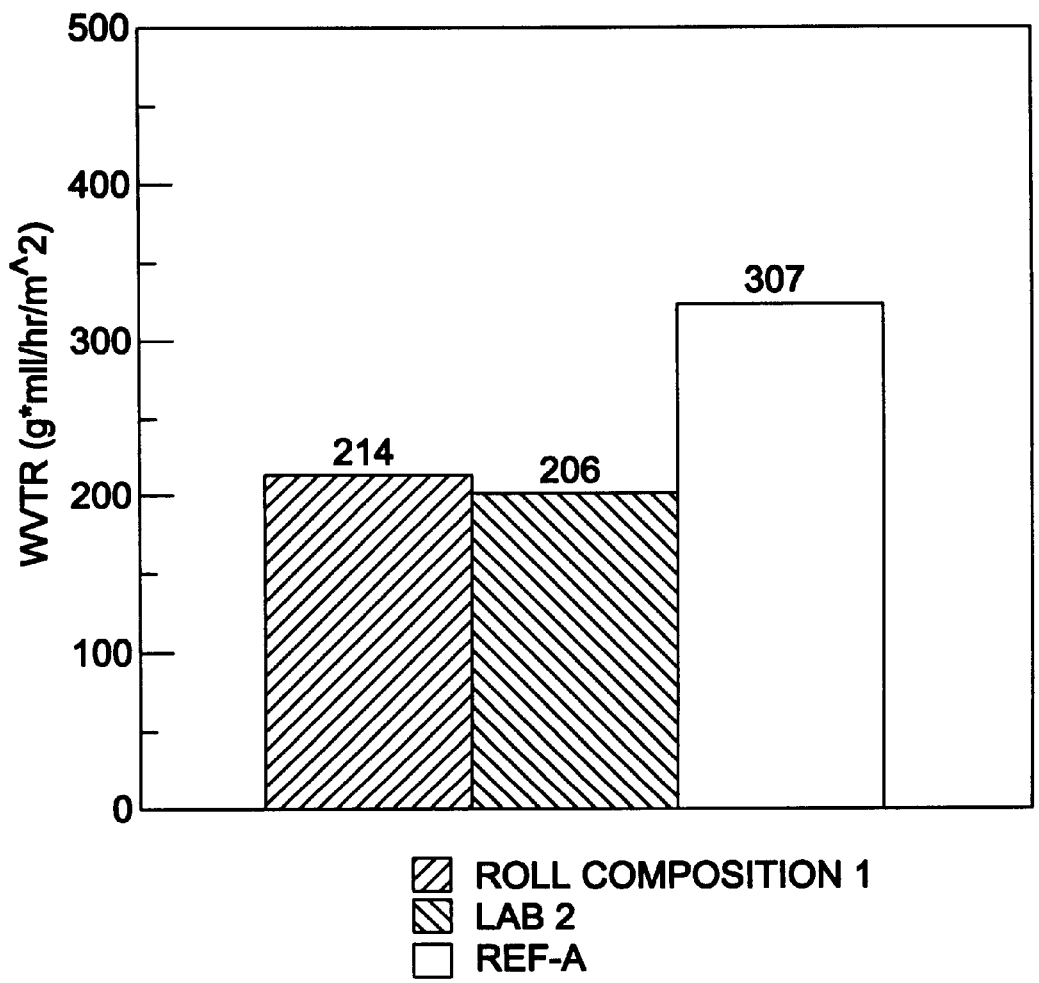
FIG. 6 is a bar graph plotting water vapor transfer for 12 P&J compounds measured at 152° F. and 90% relative humidity.
Figure 13:
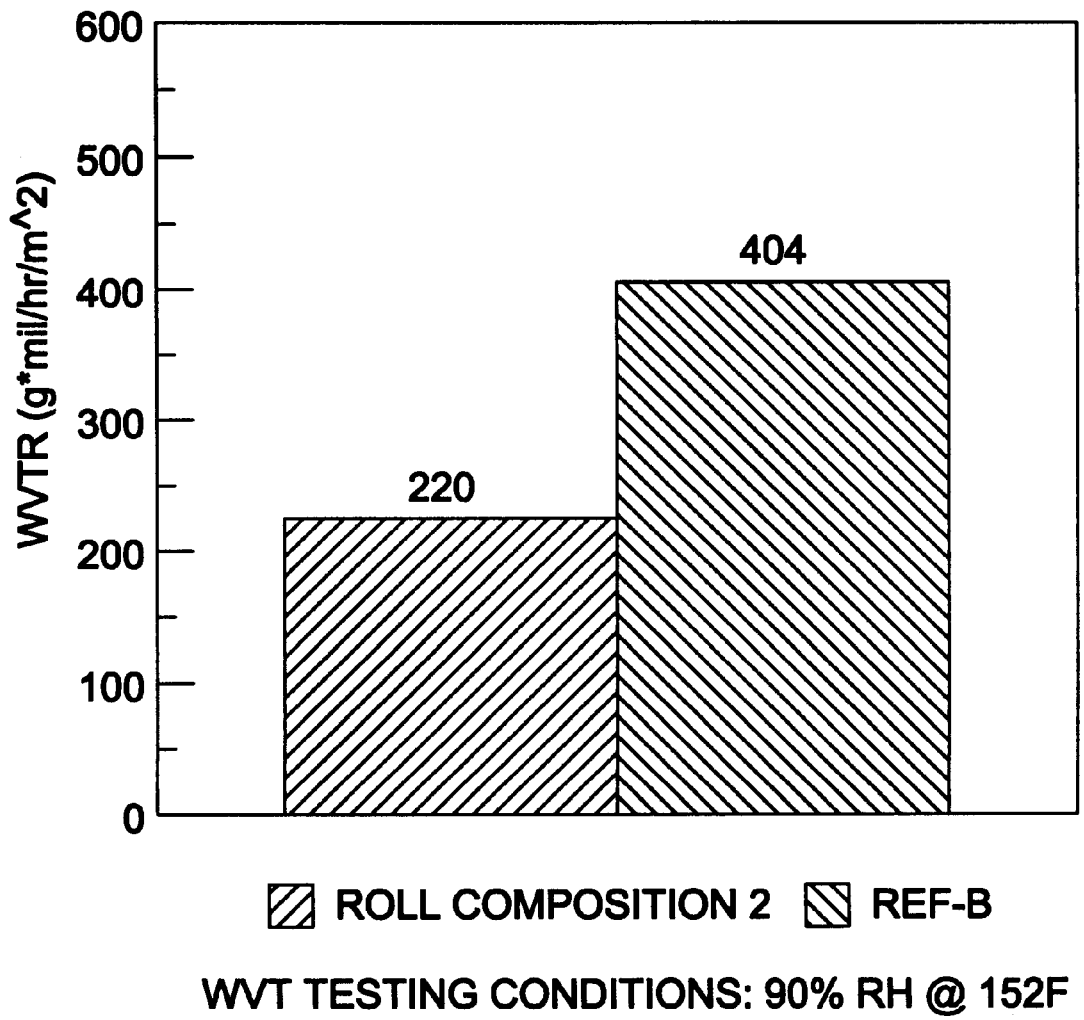
FIG. 13 is a bar graph showing water vapor transfer for 16 P&J compounds at 152° F. and 90% relative humidity.

FIGS. 6 and 13 show the WVT rate comparisons for the 12 and 16 P&J compounds, respectively. The Roll Composition 1 exhibited consistent WVT rates of 214 WVTR gml/hrm$^2$. The lab cast version exhibited a 206 WVT rate. Both compounds had considerably lower WVT rates (30%) than the reference A compound. The Roll Composition 2 had a WVT rate almost 50% less than the WVT rate of the reference B compound.

EXAMPLE 6

Abrasion Testing

Figure 7:
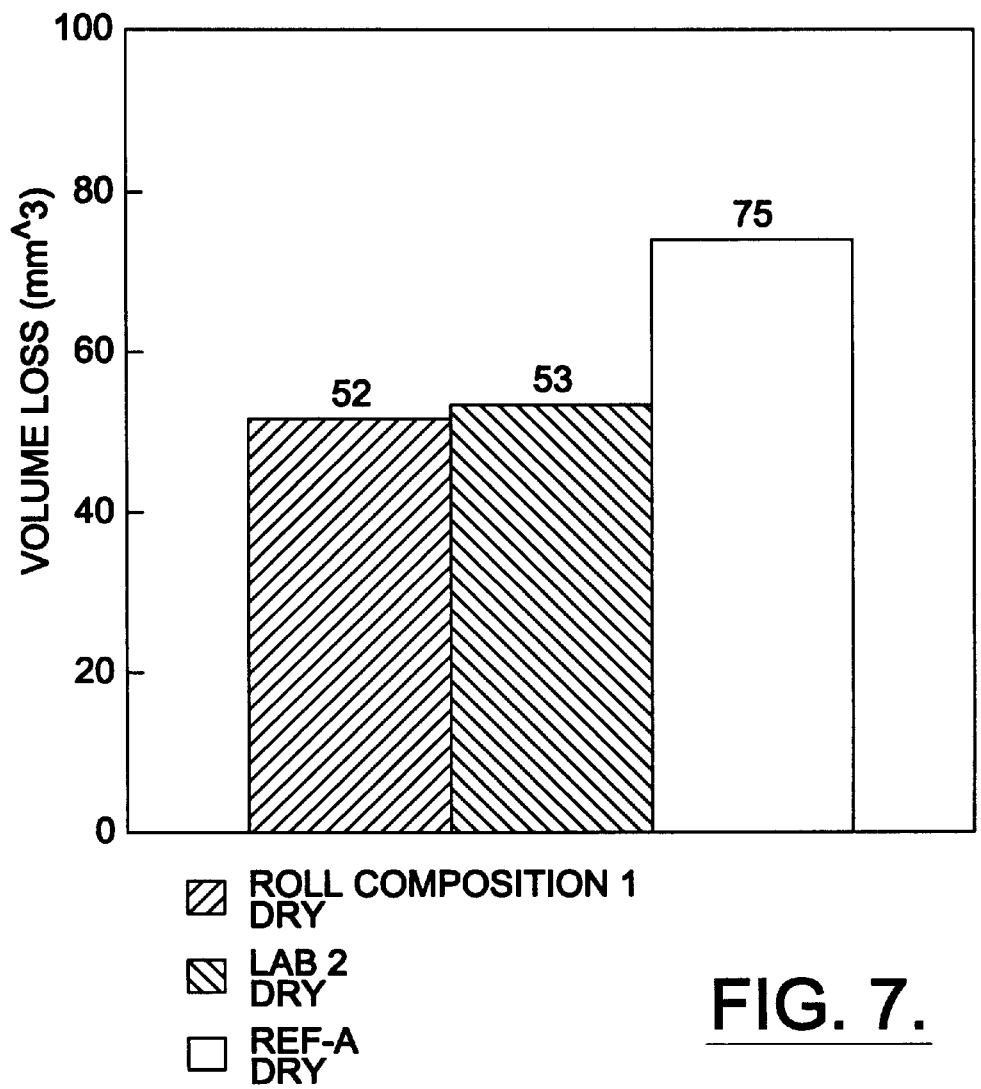
FIG. 7 is a bar graph plotting abrasion resistance for 12 P&J compounds.
Figure 14:
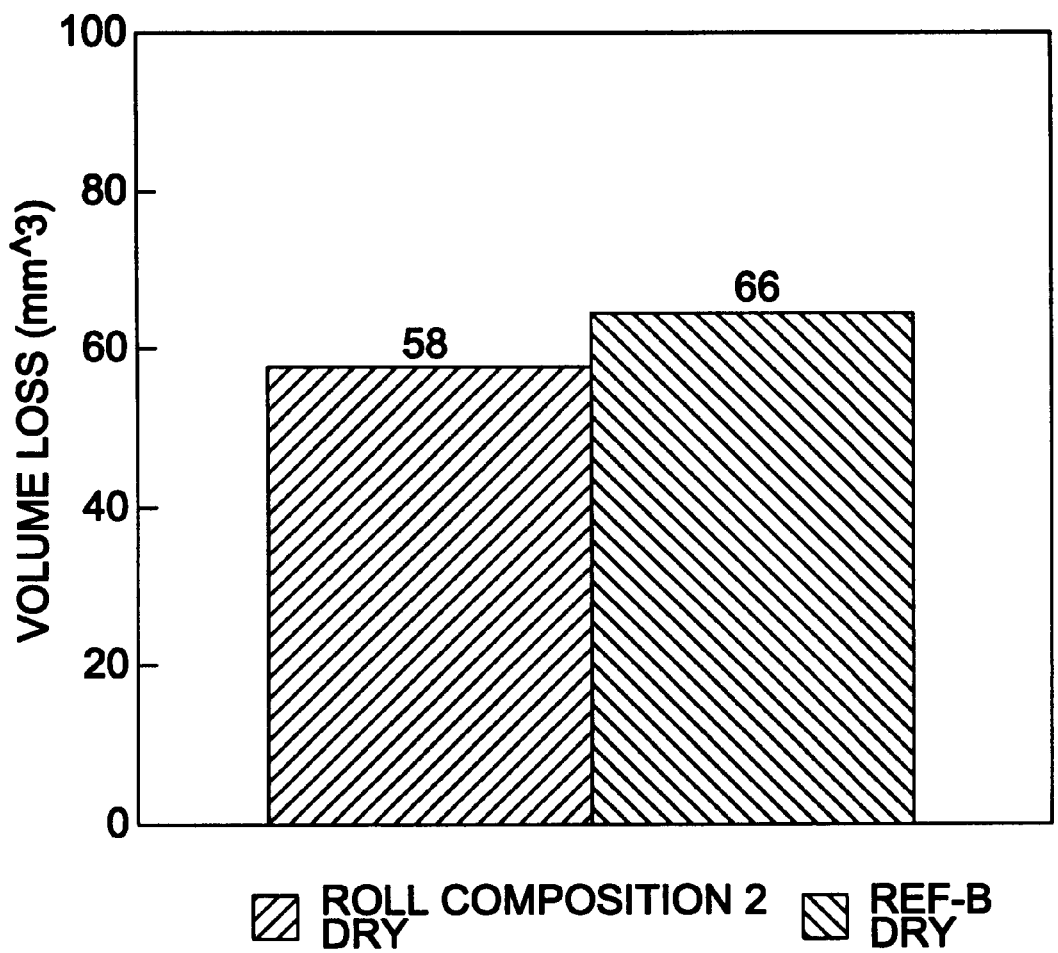
FIG. 14 is a graph showing abrasion resistance of 16 P&J compounds.
Figure 15:
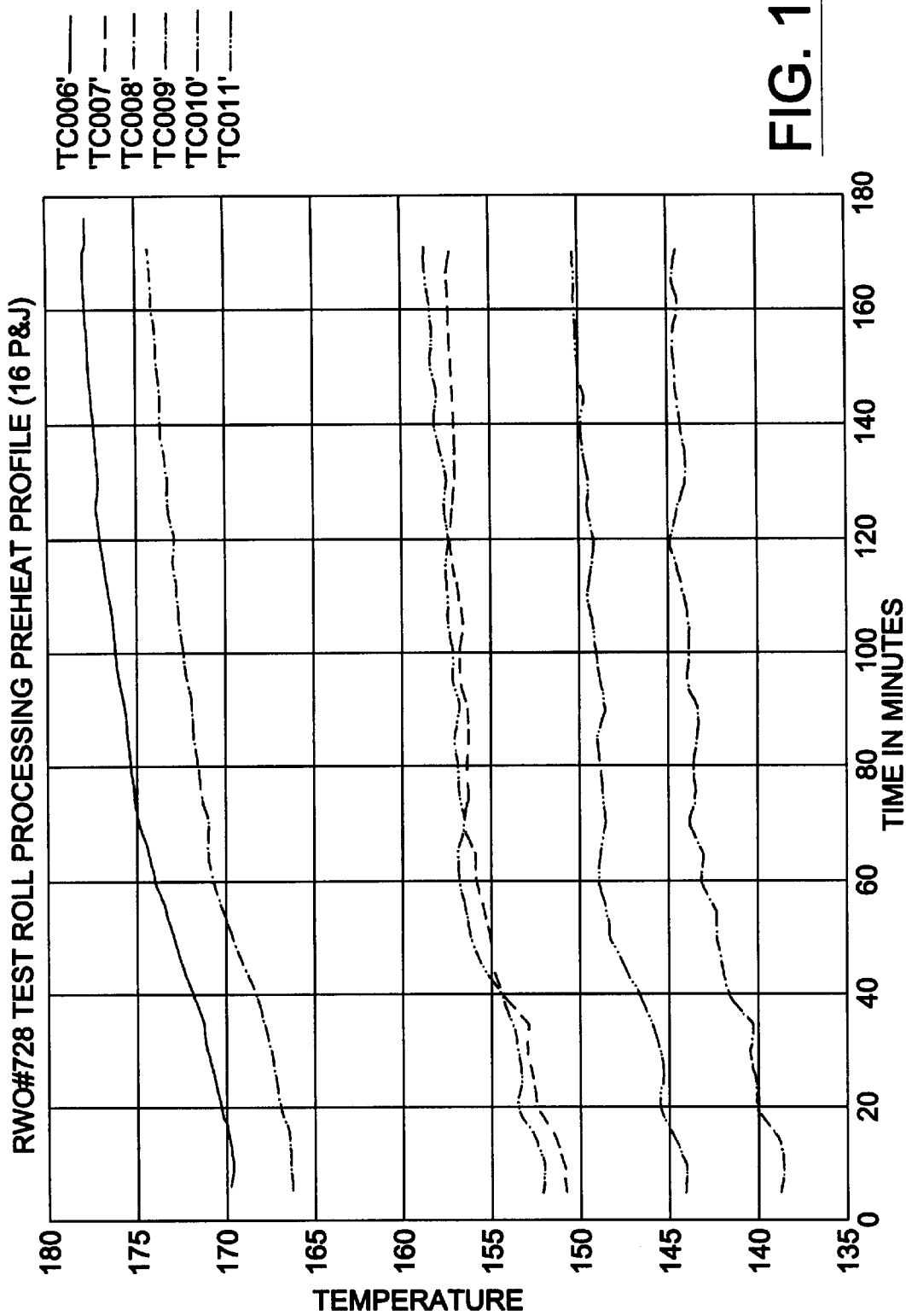
FIGS. 15 and 16 are graphs plotting temperature as a function of time measured at the thermocouples of the mold of FIG. 21 during processing.

DIN abrasion testing was performed on machined dry cover samples in accordance with the procedures and equipment described in DIN 53516. FIG. 7 and FIG. 14 present the DIN abrasion resistance comparisons for the 12 and 16 P&J compounds, respectively. The test results demonstrate there is no difference found between the dry volume loss of Roll Composition 1 and the lab cast version. Both show 30% reductions in volume loss compared to the reference A compound. The Roll Composition 2 demonstrated comparable abrasion resistance to the reference B compound.

EXAMPLE 7

Glass Transition Temperature Determination

The glass transition temperature (Tg) of the test roll samples were also identified using Differential Scanning Colorimetry (DSC) thermograms. The samples were tested at a temperature increase rate of 10° C./min. between 30°–250° C. The onset transition temperatures of the Roll Compositions 1 and 2 were 190° C. and 186° C., respectively.

EXAMPLE 8

Drilling and Grooving Evaluations

Drilling and grooving tests were conducted on the Roll Composition 1 and 2 cover samples. Holes were drilled in samples using both standard and brad bits in a #4 drilling pattern. A #3 drilling pattern was also tried on the Roll Composition 2 sample. A 0.028 in. wide blade was used to form grooves on both the Roll Composition 1 and 2 sections.

The drilling and grooving processes did not reveal any problems with the Roll Compositions 1 and 2. For the Roll Composition 1, the cover without machining had 12–12.2 P&J and 59 ShD ratings. Drilled, the compound had a 13.8 P&J rating. Grooved, the compound had a 17.5 P&J rating. Drilling and grooving combined produced a 18.5 P&J rating.

For the Roll Composition 2, the cover without machining had 15.2 P&J, 53 ShD, and 96 ShA ratings. Drilled, the compound had a 17 P&J rating. Grooved, the compound had a 17 P&J rating. Drilling and grooving combined produced a 20 P&J rating.

The foregoing embodiments and examples are illustrative of the present invention, and are not to be construed as limiting thereof. The invention is defined by the following claims, with equivalents of the claims to be included therein.

That which is claimed:
1. A composition, comprising:
   a prepolymer comprising the reaction product of the combination of a diisocyanate and polytetramethylene ether glycol; and
   a curing agent comprising a diamine selected from the group consisting of methylene o-chlorodianiline, methylene chlorodiethyl dianiline and dimethylthio-toluene diamine and a hydroxyl-terminated polybutadiene;
   said prepolymer and said curing agent being combined in a stoichiometric ratio of between about 80 and 110 percent.
2. The composition defined in claim 1, wherein said diisocyanate is an aromatic diisocyanate.
3. The composition defined in claim 1, wherein said diisocyanate comprises toluene diisocyanate.
4. The composition defined in claim 1, wherein said diamine comprises 4,4'-methylene-bis-(2-chloroaniline).
5. The composition defined in claim 1, wherein said hydroxyl-terminated polybutadiene has a molecular weight of between about 1,000 and 2,000 g/mol.
6. A method of forming a polyurethane article, comprising the steps of:
   providing a prepolymer composition comprising a diisocyanate and polytetramethylene ether glycol, and a curing agent comprising a diamine selected from the group consisting of methylene o-chlorodianiline, methylene chlorodiethyl dianiline and dimethylthio-toluene diamine and a hydroxyl-terminated polybutadiene;
   combining said prepolymer composition with said curing agent, said prepolymer and said curing agent being combined in a stoichiometric ratio of between about 80 and 110 percent; and
   curing said prepolymer composition and said curing agent to conditions sufficient to form a polyurethane article.
7. The method defined in claim 6, wherein said curing step comprises heating said prepolymer composition and said curing agent to a temperature and for a duration sufficient to effect curing thereof.
8. The method defined in claim 6, wherein said diisocyanate is an aromatic diisocyanate.
9. The method defined in claim 6, wherein said diisocyanate comprises toluene diisocyanate.
10. The method defined in claim 6, wherein said diamine comprises 4,4'-methylene-bis-(2-chloroaniline).
11. The method defined in claim 6, wherein said hydroxyl-terminated polybutadiene has a molecular weight of between about 1,000 and 2,000 g/mol.

* * * * *